United States Patent [19]
Quick, Jr.

[11] Patent Number: 5,673,259
[45] Date of Patent: Sep. 30, 1997

[54] RANDOM ACCESS COMMUNICATIONS CHANNEL FOR DATA SERVICES

[75] Inventor: Roy F. Quick, Jr., San Diego, Calif.

[73] Assignee: Qualcomm Incorporated, San Diego, Calif.

[21] Appl. No.: 412,648

[22] Filed: May 17, 1995

[51] Int. Cl.⁶ .................. H04J 13/00; H04Q 7/30
[52] U.S. Cl. .................. 370/342; 370/349; 455/38.3
[58] Field of Search .................. 370/18, 50, 95.1, 370/95.3; 375/200, 205; 455/38.1, 38.2, 38.3; 340/825.44

[56] References Cited

U.S. PATENT DOCUMENTS

| | | | |
|---|---|---|---|
| 5,241,542 | 8/1993 | Natarajan et al. | 370/95.3 |
| 5,384,777 | 1/1995 | Ahmadi et al. | 370/95.3 X |
| 5,491,837 | 2/1996 | Haartsen | 370/95.3 X |

FOREIGN PATENT DOCUMENTS

| | | | |
|---|---|---|---|
| 0642283 | 3/1995 | European Pat. Off. | H04Q 7/22 |
| 9405095 | 3/1994 | WIPO | H04B 7/24 |

OTHER PUBLICATIONS

Giuseppe Bianchi et al., "Dynamic Channel Allocation Procedures for Packet Data Services over GSM Networks", *ISS '95*, vol. 1, Apr. 1995, pp. 246–250.

Frank Mademann, "General Packet Radio Service—a Packet Mode Service within the GSM", *ISS '95*, vol. 1, Apr. 1995, pp. 36–40.

*Primary Examiner*—Melvin Marcelo
*Attorney, Agent, or Firm*—Russell B. Miller; Roger W. Martin

[57] ABSTRACT

In a digital communication system for communicating digital information, the digital communication system having a forward link and a reverse link, a system and method for communicating a data packet. The system comprises a communicating transceiver, from among a number of digital transceivers, for sending the data packet on a random access channel over the reverse link and for receiving the digital information from the forward link. The system also comprises a base station for receiving the data packet on the random access channel from the reverse link and for sending the digital information over the forward link. The digital transceivers share the random access channel. The digital transceivers have a bandwidth demand. The system may also include a dedicated channel for communicating the data packet between the communicating transceiver and the base station and a processor for switching from the random access channel to the dedicated channel when the bandwidth demand exceeds a first threshold, and for switching from the dedicated channel to the random access channel when the bandwidth demand drops below a second threshold. The system is well suited for use in CDMA applications.

48 Claims, 19 Drawing Sheets

RANDOM ACCESS COMMUNICATIONS CHANNEL FOR DATA SERVICES

BACKGROUND OF THE INVENTION

I. Field of the Invention

The present invention relates to a random access communications channel for data services. More particularly, the present invention relates to a method for sharing the resources of existing channels in a cellular telephone communications system among a large number of packet data users, each having a variable and unpredictable demand for transmission resources.

II. Description of the Related Art

Cellular telephone systems have traditionally provided voice services, patterned on the land telephone system model. In that model, a user places a call by requesting a connection between one telephone terminal and another such terminal. Once the connection is established, it remains in place until the calling party or the called party requests that the connection be released. While the connection is established, the telephone system dedicates system resources, such as trunk bandwidth, to the call. The resources are dedicated at all times, regardless of whether the callers talk or are silent. The system resources are not shared among calls.

The land telephone model is followed in conventional cellular systems. For example, two systems that follow that model are the Advanced Mobile Phone System ("AMPS") cellular system, described in "Mobile Station/Land Station Compatibility Specification," ANSI/EIA/TIA-553 (September 1993), and the time division multiple access ("TDMA") system, described in "Cellular System Dual-Mode Mobile Station/Base Station Compatibility Standard," EIA/TIA/IS-54-B (September 1992). The code division multiple access ("CDMA") cellular system, described in "Mobile Station/Base Station Compatibility Standard for Dual-Mode Wideband Spread Spectrum Cellular System," TIA/EIA/IS-95, Telecommunications Industry Association (July 1993), allows sharing of radio bandwidth, but follows the land telephone model for connections between the mobile switching center ("MSC") and the public switched telephone network ("PSTN").

The CDMA system described above uses a 1.23 MHz bandwidth to serve multiple calls, using a CDMA scheme. Each user is assigned a unique code. All user terminals sharing the radio channel transmit simultaneously, and the receivers use the unique code to identify and decode a signal from the terminal that is to be received. The process is limited by the interference generated by the other transmitters. So long as the desired signal can be maintained sufficiently strong relative to the total interference, the signal can be successfully demodulated. When the number of users exceeds the CDMA channel's capacity, however, the necessary signal strength cannot be maintained. This CDMA cellular system provides for a total of 64 forward link channels per cell in each 1.23 MHz band. Experiments have shown that such a system can support more than 60 simultaneous calls per cell in the 1.23 MHz bandwidth under benign propagation and interference conditions.

The CDMA cellular telephone system also provides a means of serving a large population of cellular telephone units, most of which are idle, i.e., not involved in a call. These idle units monitor a special control channel known as the "Paging Channel," which continuously transmits system information and paging messages. Paging messages are used to inform a mobile terminal that a caller wishes to establish a call connection to the mobile. Each Paging Channel has one or more associated "Access Channels." The Access Channels use multiple-access protocols, by which the mobile terminals transmit call requests (originations) and answer paging messages. When a connection is established, the cellular base station assigns the mobile station a dedicated "Traffic Channel" to carry the voice information for the duration of the call.

The CDMA system was designed to exploit the idleness of the mobile terminals. If this were not so, the number of mobile terminals supported would be limited to fewer than 64 per cell, because of the limited number of channels provided in the system design. Because most terminals are idle, the system can support several orders of magnitude more mobile terminals per cell, thereby justifying the choice of 64 channels as an upper limit.

Users of packet data services often utilize system resources in a manner that varies over the course of the packet data session. File transfers, e-mail, and information retrieval are examples of packet data services that follow this pattern. For these services, a few packets are sent while the user selects the file, e-mail, or other information to be retrieved, then a long sequence of packets is sent or received while the information is transferred.

In other types of data packet services, only a few packets are sent during an exchange of data, and the exchanges occur on an irregular basis. Examples of such services include: credit verification, message and paging services, order entry, and delivery routing.

The manner in which these two types of data packet services utilize resources suggests that a packet service should provide two basic service modes. First, for those cases where large amounts of data are to be transferred, a service mode should be available that optimizes the data throughput. Second, for cases where packet transmission is infrequent and irregular, dedicating a channel assignment to each user would be wasteful of system resources, because the dedicated channels would be unused most of the time. For this second case, then, a service mode should be available that optimizes the sharing of resources, i.e., optimizing channel usage. It should be possible for a packet service to switch between the two modes in response to usage demand.

Conventional cellular systems, including CDMA, however, have neither the capability to efficiently and effectively handle both types of data packet services, nor the capability to switch between the two. While the CDMA Traffic Channels do provide dedicated channel assignments and can thus be used to handle high-throughput packet service to prevent the throughput reduction resulting from channel sharing, they are inefficient for low throughput, irregular and infrequent data packet transmissions. Thus, a multiple-access protocol is required for a service mode that optimizes sharing of resources.

Despite providing multiple-access protocols, the existing CDMA Paging and Access Channels operate in a manner that is not well suited to data packet services. For example, those channels can support only a small packet size, which reduces the effective throughput of the channel because each packet contains header information as overhead. This overhead occupies a greater fraction of the available channel bandwidth when the packets are small.

Furthermore, the Paging and Access Channels cannot support long packet sizes because of their access methods. The Access Channel provides no power control feedback that would allow the base station to maintain the mobile terminal's signal strength in an acceptable range during a prolonged transmission. Instead, mobile terminals simply transmit messages repeatedly, with increased transmit power on successive attempts, until the base station acknowledges reception of the message. Because longer messages are more susceptible to errors caused by interference or fading, the mobile terminal's power level may reach very high levels when attempting to send a long message. This would result in excessive interference to other users during the transmission. On the Paging Channel, moreover, long packets cannot be supported because of the structure of the channel. Messages are limited to a maximum of 255 octets, and no mechanism exists for fragmenting longer messages.

The Access Channel also is incapable of identifying multiple propagation paths. On Traffic Channels, each of the mobile terminals has a unique spreading code that is used by the base station to identify and exploit multiple propagation paths, using a signal combining method. On the Access Channel, in contrast, all mobile terminals use the same spreading code for transmissions, making multiple propagation paths indistinguishable from transmissions from other mobile terminals.

In some present systems, it is possible to provide connectionless data services, based on the delivery of individual data packets from many users who transmit data packets in bursts. Such services preferably do not utilize fixed allocations of communication resources and allow the sharing of such resources among multiple users. In many present communications systems, and in particular digital cellular systems and CDMA cellular, however, no capability exists to provide for communication of data packets from many bursty users. In such systems, efficient support for connectionless data services requires changes in the access methods used on the radio channel and in the land network.

Therefore, a need exists for a random access data packet channel that can share communication channel resources among a large number of bursty packet data users, each having a variable and unpredictable demand for transmission resources, and for a way to switch between such a random access channel and a dedicated data channel. A need also exists for a coding scheme that can be used to identify users on the random access channel and a scheme for overlaying the random access channel with control channels.

SUMMARY OF THE INVENTION

Accordingly, the present invention is directed to a random access channel for packet data services in a wireless communications system that substantially obviates one or more of the problems due to the limitations and disadvantages of the related art.

Additional features and advantages of the invention will be set forth in the description that follows and in part will be apparent from the description, or may be learned by practice of the invention. The objectives and other advantages of the invention will be realized and attained by the apparatus particularly pointed out in the written description and claims of this application, as well as the appended drawings.

To achieve these and other advantages, and in accordance with the purpose of the invention as embodied and broadly described herein, in a digital communication system for communicating digital information, the digital communication system having a forward link and a reverse link, the invention is a system for communicating a digital data packet. The system of the present invention comprises digital transceivers for sending the digital data packet on a random access channel over the reverse link and for receiving the digital information from the forward link. The system further comprises a digital base station for receiving the digital data packet on the random access channel from the reverse link and for sending the digital information over the forward link, wherein the digital transceivers make packet service requests on the random access channel and thereby share the random access channel.

In another aspect, in a digital communication system for communicating digital information, the digital communication system having a forward link and a reverse link, the present invention is a method for communicating a digital data packet. The method comprises sending the digital data packet on a random access channel over the reverse link and receiving the digital information from the forward link by a number of digital transceivers. The method further comprises receiving the digital data packet on the random access channel from the reverse link and sending the digital information over the forward link by a digital base station, wherein the digital transceivers make packet service requests on the random access channel and thereby share the random access channel.

In another aspect, in a digital communication system for communicating digital information, the digital communication system having a digital transceiver and a digital base station, the digital transceiver having a bandwidth demand, the present invention is a system for communicating digital data packets. The system of the present invention comprises a random access channel and a dedicated channel for communicating the digital data packets between the digital transceiver and the digital base station. The system further comprises a processor for switching from the random access channel to the dedicated channel if the bandwidth demand exceeds a first threshold level and from the dedicated channel to the random access channel if the bandwidth demand below a second threshold level and/or if the digital transceiver is highly mobile, frequently moving from the coverage area of one base station to the coverage area of another.

In yet another aspect, in a digital communication system having a broadcast channel for communicating system information and an access channel for making access requests, the system information including paging messages, the digital communication system including a plurality of transceivers each having a specific long code, the present invention is a system for communicating a digital data packet. In the system of the present invention, a communicating transceiver from among the plurality of transceivers initializes a packet service request, requests a searcher reservation on the access channel, and sends the digital data packet over a random access channel using the specific long code corresponding to the communicating transceiver to obtain a coded digital data packet. The system comprises a base station, including a plurality of searchers and a controller for locating a free searcher from the plurality of searchers and for sending to the free searcher the specific long code corresponding to the communicating transceiver. Further, the base station assigns the free searcher to the communicating transceiver and receives the coded digital data packet from the communicating transceiver over the random access channel. The plurality of transceivers share the random access channel.

In all of the systems and methods described above and in the following description, the digital data can be communicated over the digital cellular communications system using code division multiple access (CDMA). CDMA is a spread spectrum method of multiplexing transmissions by encoding the transmissions so that they are each distinctive. CDMA multiplexing permit a larger number of transceivers (i.e., mobile telephone units) to communicate within a communication network than would other wise be possible without this spread spectrum technique.

It is to be understood that both the foregoing general description and the following detailed description are exemplary and explanatory only and are not restrictive of the invention, as claimed.

The accompanying drawings are included to provide a further understanding of the invention and are incorporated in and constitute a part of this specification, to illustrate the embodiments of the invention, and, together with the description, to explain the principles of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
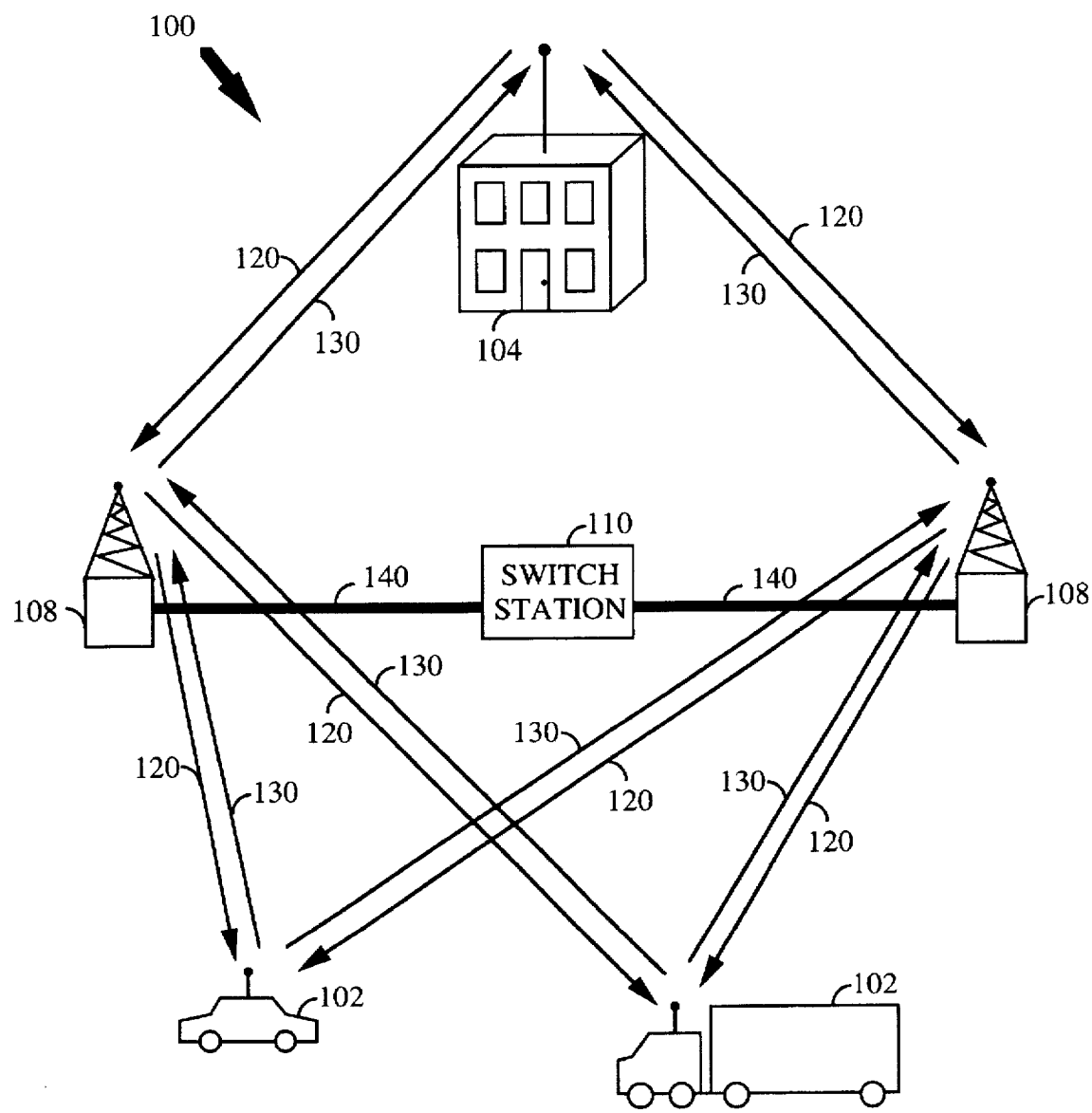
FIG. 1 is a schematic overview of an exemplary mobile cellular telephone system.

Reference will now be made in detail to the present preferred embodiments of the invention, examples of which are illustrated in the accompanying drawings. Wherever possible, the same reference numerals will be used throughout the drawings to refer to the same or like parts.

In accordance with the present invention, in a digital communication system for communicating digital information having a forward link and a reverse link, a system and method are provided for communicating digital data packets. The system comprises digital transceivers, for example, mobile cellular telephones, for sending the digital data packets on a random access channel over the reverse link and for receiving digital information from the forward link. The system also comprises a digital base station for receiving the digital data packet on the random access channel from the reverse link and for sending digital information over the forward link. The digital transceivers make packet service requests on and thereby share the random access channel.

I. SYSTEM DESIGN

A. Applications

An exemplary embodiment of a terrestrial digital cellular mobile telephone system in which the present invention may be embodied is illustrated in FIG. 1 and designated generally by reference numeral 100. The digital communication system illustrated in FIG. 1 may utilize TDMA, CDMA, or other digital modulation techniques in communications between the remote user units 102,104 (which may be fixed or mobile and may also be referred to as mobile stations) and the cell-sites (or base stations) 108. For the remainder of this description, the terms "cell-site" and "base station" will both be used to refer to terrestrial transceivers that communicate over-the-air with remote and/or mobile units. It is not intended, however, that the present invention be limited to cellular systems and thus to cell-sites. Cellular systems in large cities may have hundreds or thousands of mobile telephones 102 and many cell-sites 108. Nevertheless, the present system is not limited to mobile telephones 102 and may be used to interconnect a fixed position cellular communications device 104. For example, a cellular transceiver 104 can be supplied at a building in order to send and receive data and/or voice communications between some device in the building and a switching station 110 that collects the data. Transmissions from the cell-sites 108 to the remote user units 102, 104 are sent on a forward link 120, while transmissions in the opposite direction are sent on a reverse link 130. The cell sites 108 are coupled to the switching station 110 via backhaul 140 or may be linked to the switching station 110 over-the-air.

An example of such a use would be a company that has many vending machines throughout a wide area and that needs to monitor the requirements of those vending machines. The vending machines could be equipped with a digital cellular transceiver 104 that can send and receive data to and from the switching station 110, including whether the machine is empty, which slots are empty, whether the supply is running low, and whether the machine has malfunctioned. In such an application, the vending machines would not need to communicate large amounts of data at any one time, but rather only short packets, such as status reports and malfunctions, and then only sporadically. With many vending machines needing to communicate data packets to the switching station 110, and vice versa, it would be inefficient and impractical to have the vending machines communicate over a dedicated communication channel, in which system resources would be dedicated to each vending machine that required channel time.

A more efficient approach is to provide a random access channel over which the vending machines can communicate with the switching station 110. With a random access channel, the vending machines could request channel time only when they need it. Because the vending machines require channel time only infrequently and briefly, literally thousands of vending machines could share a single random access channel without significant transmission delays due to the random access channel being busy.

Another application in which a random access channel on a digital cellular system is useful would be where a fleet of taxicabs reports information back to a dispatcher. Each taxicab must keep the dispatcher apprised, for example, of the cab's location and availability and must monitor requests for service. As with the vending machine example, many cabs must communicate with the dispatcher, but only with data packets that are sent sporadically. Accordingly, in this example as well, a random access channel would more efficiently serve the communications needs of the taxicab fleet and dispatcher than would a dedicated data channel. Furthermore, the cabs could be equipped with a voice/data transceiver so that they can communicate by voice with the dispatcher when needed and send and receive data from the dispatcher. Communicating both voice and data over the same system is made possible by the use of a digital system, for in such systems both the voice and data transmissions are in digital format.

Therefore, in accordance with the present invention, a system for communicating short digital data packets over a random access channel is provided within the system 100 of FIG. 1. An additional feature of the system of the present invention is the ability to send digital data packets over a dedicated data channel in the system 100. To facilitate sending digital data packets over the random access and dedicated channels, the present invention includes means for switching between the random access and dedicated data channels, depending on the bandwidth demand of the user (or mobile unit) that is communicating data packets. The details of the present invention, including the means for switching between the random access and dedicated data channels, will be described in detail below.

While applicable to any digital communications system, the system of the present invention is particularly well suited to the use of CDMA techniques. In a CDMA system, a "User Specific Long Code" is used to encode data and voice transmissions sent over the system. As used herein, the term User Specific Long Code (or Long Code) may refer to a general spreading code used for encoding transmissions. The use of User Specific Long Codes is a spread spectrum technique by which the data and voice transmissions are altered in such a way as to allow one user's data or voice to be distinguished from that of other users. Thus, User Specific Long Codes are a means of identifying one system user from many users and extracting that one user's data from the sum of the data of all the other users.

As embodied herein, User Specific Long Codes are selected such that they are uncorrelated over one modulation symbol time. Two long codes are uncorrelated if the result of exclusive-or-ing them results in an equal number of 1's and 0's when statistically averaged. For example, the following are orthogonal: 0110 and 0101, because 0110 XOR 0101=0011, i.e., an equal number of 1's and 0's. Long Codes generated as temporal shifts of maximal-length shift register sequences are an example of a means for producing uncorrelated codes. The Long Codes are generated such that they have long periods; i.e., the pattern of Long Codes repeats very infrequently. For example, if a Long Code is 42 bits long, the period will be $2^{42}-1$. Because data sent by one of many users on the system must be distinguishable from all other users' data, the Long Codes must appear totally random, so that two users will not have the same Long Code. A long period for the Long Codes, such as a period of $2^{42}-1$ accomplishes this goal, because with such a long period, the Long Codes repeat very infrequently. In practice, then, having such a long period, the Long Codes are, on average, uncorrelated over one information bit time. The use of orthogonal Long Codes is well-known to those skilled in the art.

In accordance with the present invention, a searcher and a demodulation element in response to commands from a controller unit, acquire and demodulate a user's information signal. A searcher element is a sliding correlator receiver that continually scans a time domain window in search of a particular user's information signal. In a system with multiple demodulation elements, a searcher element may also scan a set of time offsets around the nominal arrival of the signal in search of multipath signals that have developed. Typically, the controller directs the searcher to scan the received signal from the base station antenna and correlate the received signal with a known PN spreading sequence (or Long Code) associated with a particular mobile transmitter. Methods for implementing correlators for this purpose are well known to those skilled in the art.

Figure 2:
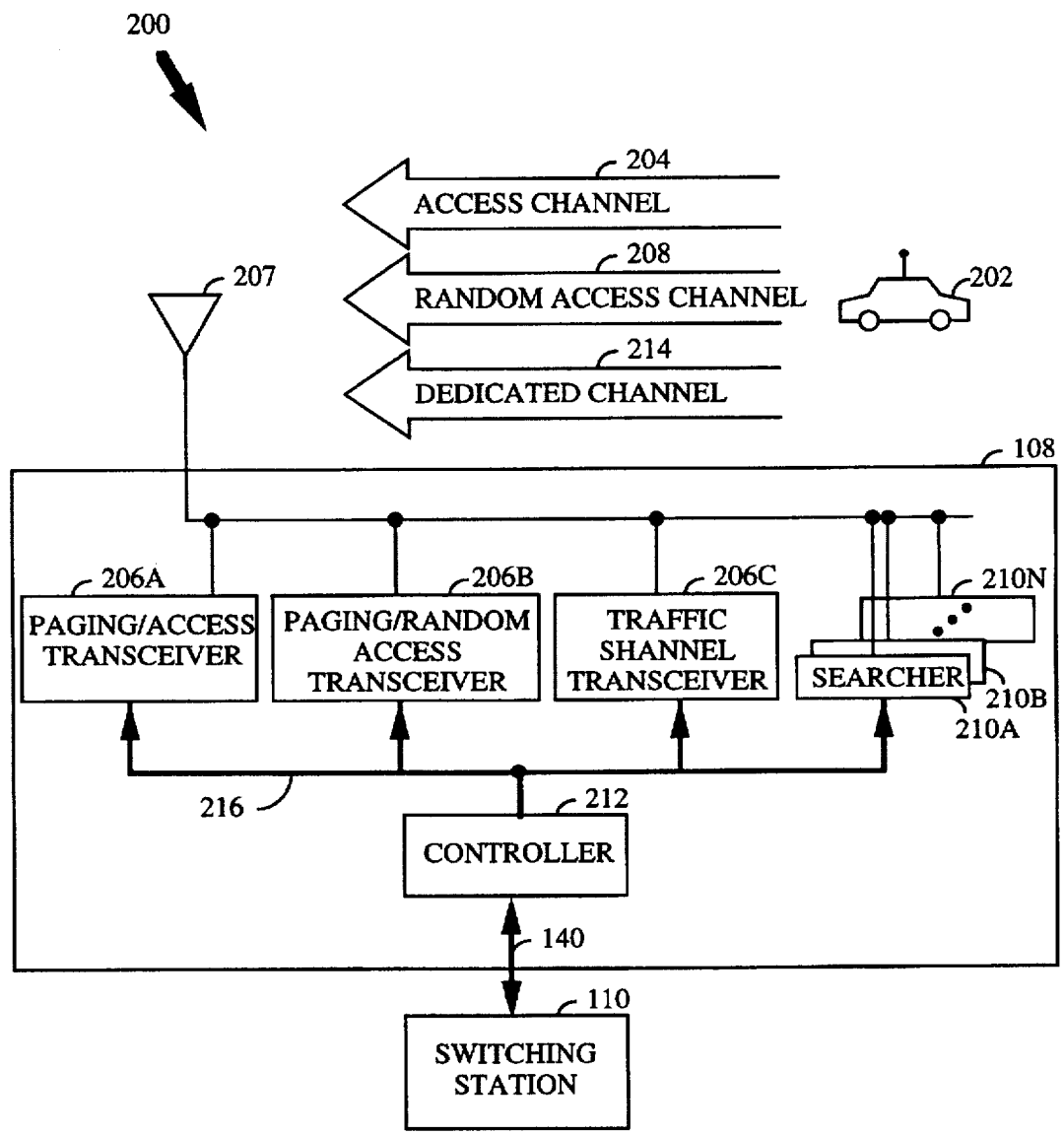
FIG. 2 is a schematic overview of the process of searcher reservation in accordance with the present invention.

In one embodiment, illustrated in FIG. 2, demodulators 206A–206C are permanently assigned to receive signals for paging/access, paging/random-access and traffic channel functions, respectively. The corresponding searchers 210A–210N may be assigned and desassigned to demodulators 206A–206C as required by controller 212 and communicated over interconnection bus 216. Generally, a searcher is assigned to search for a User Specific Long Code only when the user (or transceiver) initiates a data transmission session. The searcher to demodulator assignment scheme, which will be detailed later, enables relatively few searchers to provide service to potentially thousands of users. It should also be noted that demodulator elements 206A–206C could also be assigned, preferably also under the control of controller 212, to receive signals for purposes other than those listed previously.

In a CDMA system, each transceiver has its own personal, permanent Long Code, and each cell site 108 has searchers that search for transmissions using specific Long Codes. (Long Codes need not be permanent, however, as they can be dynamically assigned by the cell site 108, generating a private long code.) Although a user can transmit data at any time, for the data to be received by the cell site 108, the cell site 108 must assign a searcher to the Long Code corresponding to that user's transceiver. As noted above, many users (perhaps thousands) may be attempting to transmit data packets to a single cell site 108 via a random access channel. With so many users, if each had its own personal searcher seeking only that user's Long Code, the system would require literally thousands of searchers to handle all the users.

Therefore, in the present invention, each user must be assigned a searcher before data transmitted by that user can be received by the base station. Referring to FIG. 2, when a system user 202 has data to send to the switching station 110, the user 202 makes a packet data transmission request on a standard Access Channel 204, which serves the system on the reverse link, i.e., from the users 202 to the cell site 108. Although each Access Channel 204 in the system has its own particular Long Code, each user 202 has a priori knowledge of that Long Code and thus uses that Long Code to transmit over the Access Channel 204 to an paging/access channel transceiver 206A in the cell site 108 and gain access to the cell site 108, the transmission being collected at the cell site 108 by an antenna 207 that is coupled to transceiver 206A. Based on this Access Channel transmission, the cell site 108 learns of the user's 202 request to access the random access channel 208 and thereby transmits packet data over paging/random access transceiver 206B. The user 202 is assigned (i.e., granted access) to the random access channel 208.

The user 202 then sends a signal over the Access Channel to the paging/random access transceiver 206B requesting that a searcher 210 be assigned to the user 202. The transceiver 206B sends a signal to a controller 212, asking the controller 212 to locate a free searcher from among the available searchers 210 that can be assigned to the user 202. The controller 212 examines the searchers 210 and locates a free searcher (i.e., one that is not presently assigned to another user) from among the searchers 210. Once the controller 212 locates the free searcher, it assigns the free searcher to the user 202. In the cell site 108, which has a priori knowledge of each user's Specific Long Code, the transceiver 206B sends the user's 202 Long Code to the controller 212, which relays the Long Code to the free searcher.

The free searcher assigned to the user 202 can now begin searching for data packets transmitted by the user 202. The free searcher, however, has no information on when the user 202 will transmit data packets. The free searcher, therefore, simply begins searching for signals encoded with the user's 202 Long Code. If the free searcher detects multiple signals with that user's Long Code, the free searcher is thus receiving multipath signals and treats them accordingly, e.g., combining those signals to maximize the effective signal-to-noise ratio for the user 202, as described below.

Accordingly, the uniqueness of the Long Codes is used by the cell-sites 108 to identify and exploit multiple propagation paths using a signal combining method. When a signal is sent between the user 202 and a cell-site 108, the signal will likely take several propagation paths, resulting in several versions of the same signal arriving at the cell-site 108 at slightly different times. Multipath effects occur when, for example, the signal is reflected off buildings or other structures between the transmitter and the receiver. By using a specific Long Code for each of the users transmitting data, if the cell-site 108 receives several signals, it can distinguish the transmissions of one user from those of other users. Consequently, the cell-site 108 can distinguish multipath signals from the particular user of interest from those sent by other users. The cell site 108, using a signal combining method, can take the multiple signals from the one user and combine them to combat multipath fading by using all the energy available at the receiving antenna 207 and by preventing the multiple paths from combining destructively (i.e., out of phase). Signal combining methods are well known to those skilled in the art.

Thus, the user 202 must obtain a searcher assignment before the transceiver 206B will receive data packets from the user 202. As a result, because each system user does not have its own permanently assigned and unique searcher, each user need not have its own personal searcher, thereby reducing the number of searchers 210 required at each cell site 108. There need only be sufficient searchers 210 to handle the anticipated user load on the system, which is a function of the anticipated maximum number of total data packet users that will attempt to simultaneously send data packet transmissions. If this maximum number of users is exceeded, i.e., all channel(s) for communicating data packets are busy, any user that receives a busy signal will be placed in a queue to be assigned a free searcher. The user 202 does not have to place a request for the free searcher each time it has data to send. Rather, the searcher reservation scheme of the present invention will leave the free searcher assigned to the user 202 between data packets sent by user 202. The searcher reservation scheme of the present invention, which uses a priority assignment algorithm to handle outstanding requests from users to reserve a searcher, will be described in detail below.

On both random access and dedicated data channels, the power level of the signal being transmitted can be controlled in order to optimize the efficiency of the transmission and to maintain a sufficient power level so as to prevent losing any of the data being transmitted. In communications systems, a minimum threshold power level exists for data transmissions. When the power level of a signal falls below that threshold level, the cell-site 108 will be unable to read the data, resulting in data loss. On the other hand, when the strength of a signal significantly exceeds the minimum threshold power level, the signal will interfere with other signals being transmitted within the system, also resulting in data loss. Accordingly, it is not only desirable, but imperative, to control the power level of signals being transmitted over a communications system.

Various power control systems are well known in the art that are compatible with systems that communicate via spread spectrum techniques, such as CDMA. Two such systems are disclosed in U.S. Pat. Nos. 5,056,109 and 5,257,283, which are assigned to the assignee of the present invention. In those systems, and with reference to FIG. 1, cell-site 108 transmitted signal power is measured as received by the remote unit (e.g., reference numeral 102 or 104), and the transmitted power is adjusted at the unit in an opposite manner with respect to increases and decreases in received signal power. Additionally, a power control feedback scheme may be used. In that scheme, at the cell-site 108 communicating with the remote unit 102, the transmitted power from the remote unit 102 is measured as received at the cell-site 108. A command signal is generated at the cell-site 108 and transmitted to the remote unit 102 for adjusting the transmission power of the remote unit 102 corresponding to deviations in the cell-site 108 received signal power. The feedback scheme is used to adjust the remote unit's 102 transmission power so as to arrive at the cell-site 108 at a desired power level.

In CDMA systems, for example, Traffic Channels are provided to handle certain transmissions between remote units 102 and cell sites 108. Such transmissions include voice and data signals. A CDMA system may also incorporate the random access channel of the present invention, which is used to handle data packets transmitted between the remote units 102 and the cell sites 108. In accordance with the present invention, it is preferable to use the same power control method, on both the Traffic Channels and the random access channels. The use of Long Codes on the random access channels makes it possible to identify the power level of individual users and therefore makes it possible to control their power levels.

As noted above, in accordance with the present invention, and with reference to FIG. 2, both a random access channel 208 and a dedicated data channel 214 can be implemented within the same communication system. Both the random access 208 and dedicated 214 channels can be used to transmit data packets. A system having many users 202 that communicate data can have both types of channels 208, 214 and thereby accommodate a wide variety of data services. Thus, when a user 202 has a large amount of data to be transferred to the home base 110, a channel assignment is dedicated to the user 202. Only the user 202 assigned to the dedicated channel 214 will be permitted to transmit data over that channel, until the user 202 completes its data transfer. On the other hand, when a user 202 transmits bursts of data, it is preferable to have those bursts sent over a random access channel 208 shared by many users and accessed by request when bursty transmissions must be made.

Figure 3:
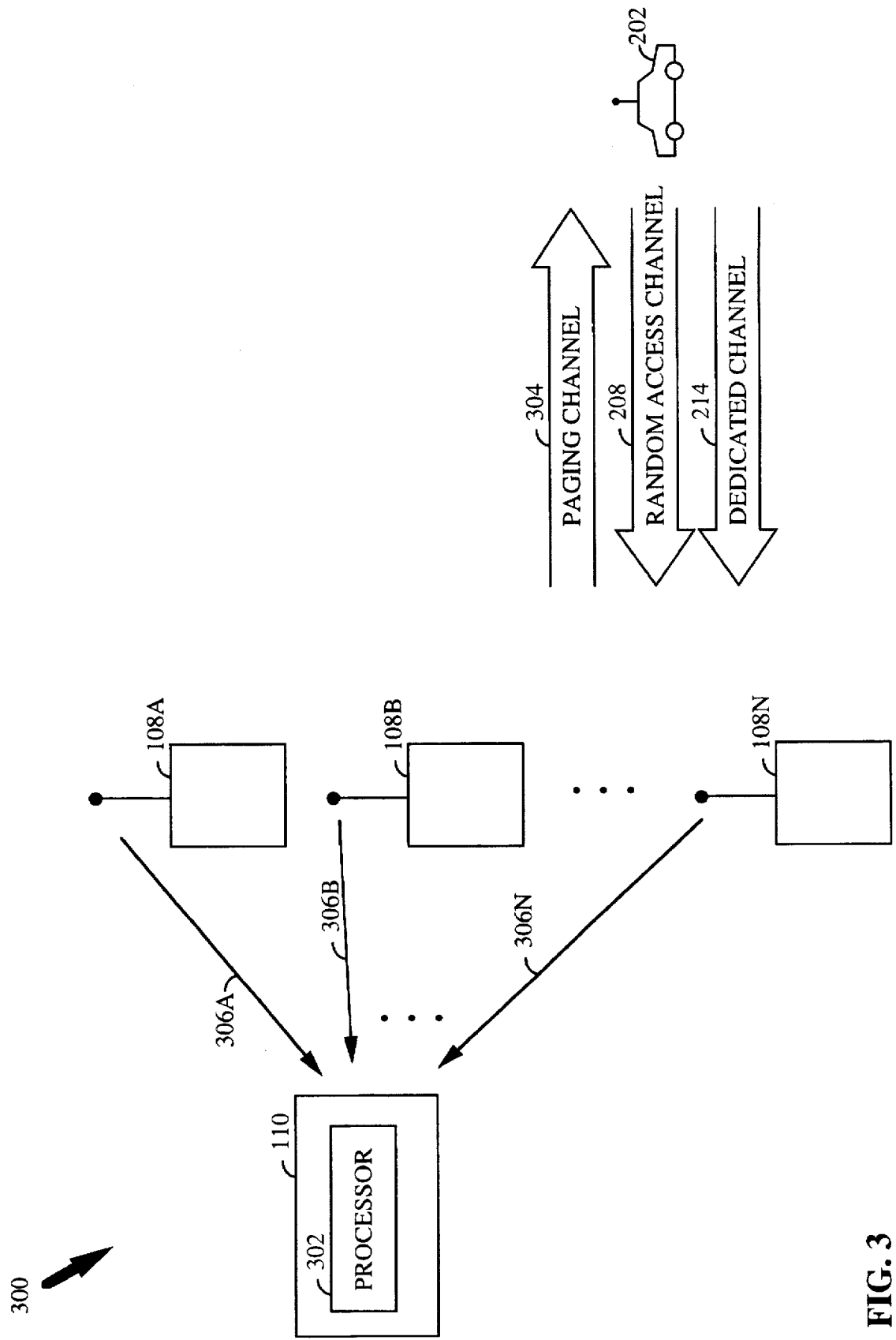
FIG. 3 is a schematic overview of the process of switching between a random access channel and a dedicated channel for reverse link communications in accordance with the present invention.

With reference to FIG. 3, a processor 302, located in switching station 110, may be provided that controls switching between the dedicated channel (or Traffic Channel) 214 and the random access channel 208. Typically, a switching station 110 collects communication information 306A–306N from the respective base station units 108A–108N. The bandwidth demand, which is included in communication information 306A–306N, is then utilized by processor 302 to determine, by a method described later, when switching between the dedicated channel 214 and the random access channel 208 is appropriate for each mobile station associated with base station units 108A–108N. Alternatively, processor 302 may determine that all the mobile stations are to switch simultaneously from dedicated channel 214 to random access channel 208 and vice-versa.

In the system of the present invention, a first threshold level, which relates to bandwidth demand, is set that determines when the processor 302 will switch a user 202, who is communicating with a cell site 108 over the random access channel 208, from the random access channel 208 to the Traffic Channel 214. As illustrated, the processor 302 may be located at switching station 110. Alternatively, processor 302 could be located at each individual cell site (not shown). In either implementation, the processor 302 may cause a switching signal, preferably over paging channel 304, to be sent the user 202, causing the user 202 to switch between the random access channel 208 and the dedicated (or Traffic) channel 214. As noted above, this first threshold level is based on a bandwidth demand of the user 202. When the bandwidth demand of the user 202 exceeds the first threshold level, the processor 302 switches the user 202 from the random access channel 208 to the Traffic Channel 214.

Conversely, a second threshold level is set that determines when the processor 302 will switch the user 202, who is communicating with the cell site 108 over the Traffic Channel 214, from the Traffic Channel 214 to the random access channel 208. This second threshold level is also based on the bandwidth demand of the user 202, and when the bandwidth demand of the user 202 drops below the second threshold level, the processor 302 switches the user 202 from the Traffic Channel 214 to the random access channel 208. As previously mentioned, the processor 302 may cause a switching signal, preferably over paging channel 304, to be sent to user 202, causing the user 202 to switch between the dedicated (or Traffic) channel 214 and the random access channel 208. Each threshold level may be adjusted independently.

As embodied herein, on the reverse link 130, the random access channel is associated with a TIA/EIA/IS-95 Paging Channel, with one or more Data Packet Channels per Paging Channel. To multiplex data packet transmissions from remote units 102 with transmissions by other remote units on the reverse link 130, the User Specific Long Codes are used.

II. RANDOM ACCESS CHANNEL DESIGN

With reference to FIGS. 4–11, the channel design of the random access channel of the present invention will be described, referring specifically to the CDMA environment and to cellular systems having mobile stations communicating with base stations. It is to be understood, however, that most of the random access channel design described herein is not limited to CDMA, but rather is applicable in other digital communications systems, including TDMA. Moreover, it should be understood that the random access channel design described herein is not limited to cellular applications or to mobile stations. First, the channel design of the random access channel forward link will be described. The channel design of the reverse link will then be described.

A. The Forward Link Channel

The forward link random access channel for carrying packet data can be considered a subchannel of a combined cellular paging and packet data channel on the CDMA forward link. An example of a cellular paging channel is the CDMA Paging Channel defined in TIA/EIA/IS-95. The CDMA Paging Channel is used for communication from the cell site 108 to the mobile station 104 for such purposes as broadcasting system overhead information, locating the mobile, assigning a Traffic Channel, and other signaling for system control purposes.

Various ways exist for defining a subchannel of a forward link CDMA channel. Some cellular systems pre-define data subchannels as logical subchannels in a continuous or bursty paging channel data stream. The CDMA Paging Channel (TIA/EIA/IS-95) can support a subchannel by defining a special message type that carries packet data. This method can be used without changes to the IS-95 Paging Channel procedures for Paging Channel assignment and other call control. This method, however, can be expected to provide impaired performance for the random access channel because the packet sub channel must compete with other Paging Channel messages for the Paging Channel data bandwidth. When other messages are lengthy, random access channel messages will be delayed. This delay will reduce the timeliness of busy/idle channel state feedback to the mobile stations 102, 104, thereby reducing the efficiency of channel sharing among users. To mitigate this impairment, an alternative implementation is used in the present invention.

Preferably, the CDMA random access channel is defined as a subchannel of a new set of paging and packet data channels, using a format that differs from the IS-95 Paging Channel format in such a way that normal cellular paging channel functions do not interfere with random access channel data. The new random access channels are referred to herein as Packet/Paging Channels. The Packet/Paging Channel of the present invention will now be described, with initial reference to the physical layer of the Packet/Paging Channel, and then its structure.

1. Physical Layer

The modulation characteristics of the Packet/Paging Channel are the same as that of a CDMA Paging Channel, as defined in §7.1.3 of TIA/EIA/IS-95, with the following three exceptions. First, there can be 0 to 7 Packet/Paging Channels on a forward CDMA channel, using Walsh codes starting with Walsh code 33 through 39, in sequence. The number of Packet/Paging Channels is identical to the number of Paging Channels, as broadcast in the PAGE_CHAN field of the TIA/EIA/IS-95 "System Parameters Message." Walsh codes 33–39 are selected because they are related to the CDMA Paging Channel Walsh codes through a simple transformation, namely, inversion of the last 32 bits of the 64-bit code sequence. This pairing of Paging Channels and Packet/Paging Channels may be advantageous if aggregated channels are used for higher-rate services. Any other pairing can be used, however, without substantially changing the nature of the present invention.

Second, the Packet/Paging Channel has a power control subchannel. This power control subchannel is identical to that of a CDMA Forward Traffic Channel, as described in §7.1.3.1.7 of TIA/EIA/IS-95. The power control subchannel is active only when reverse packet channel data are being received.

Figure 4:
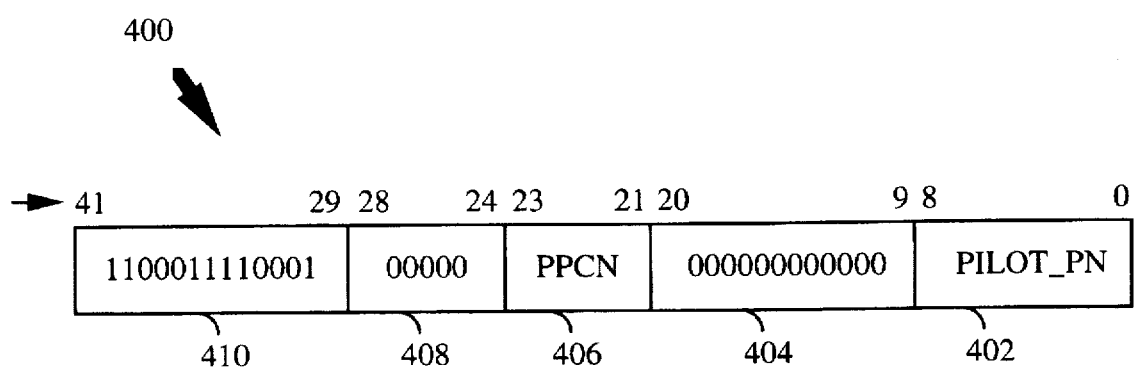
FIG. 4 illustrates a Long Code Mask used on a forward link Packet/Paging Channel.

Third, with reference to FIG. 4, the Packet/Paging Channel is scrambled using a Packet/Paging Channel Long Code mask 400. Preferably, the mask follows the parameters of the mask shown in FIG. 4. Thus, as illustrated, the Long Code mask 400 contains 42 bits (bits 0 through 41). The first portion 402 of the Long Code mask 400 is nine bits long (i.e., bits 0–8) and constitutes a Pilot Pseudo-Noise (Pilot_ PN) sequence offset index for the forward link CDMA channel. The Pilot PN sequence offset index is as defined in TIA/EIA/IS-95 §7.1.3.2.1. The second portion 404 of the Long Code mask 400 is 12 bits long (bits 9–20), each bit being a zero. The third portion 406 of the Long Code mask 400 is Packet/Paging Channel number, which is three bits long (bits 21–23) and identifies the number of the specific Packet/Paging Channel, each of which is assigned a unique number. The Packet/Paging Channel Number is in the range from 1 to 7, corresponding to the Walsh Code 33–39 assigned to the Packet/Paging Channel, in order. The fourth portion 408 is five bits long (bits 24–28), each bit being a zero. Finally the fifth portion 410 of the Long Code mask 400 is 14 bits long (bits 29–41). The 14 bits of the fifth portion 410 are selected to ensure that the same Long Code is not used for any other type of CDMA channel. They are selected arbitrarily to be different from ordinary Paging and Access Channels, and the specific value may be varied without affecting the present invention.

2. Structure

Figure 5A:
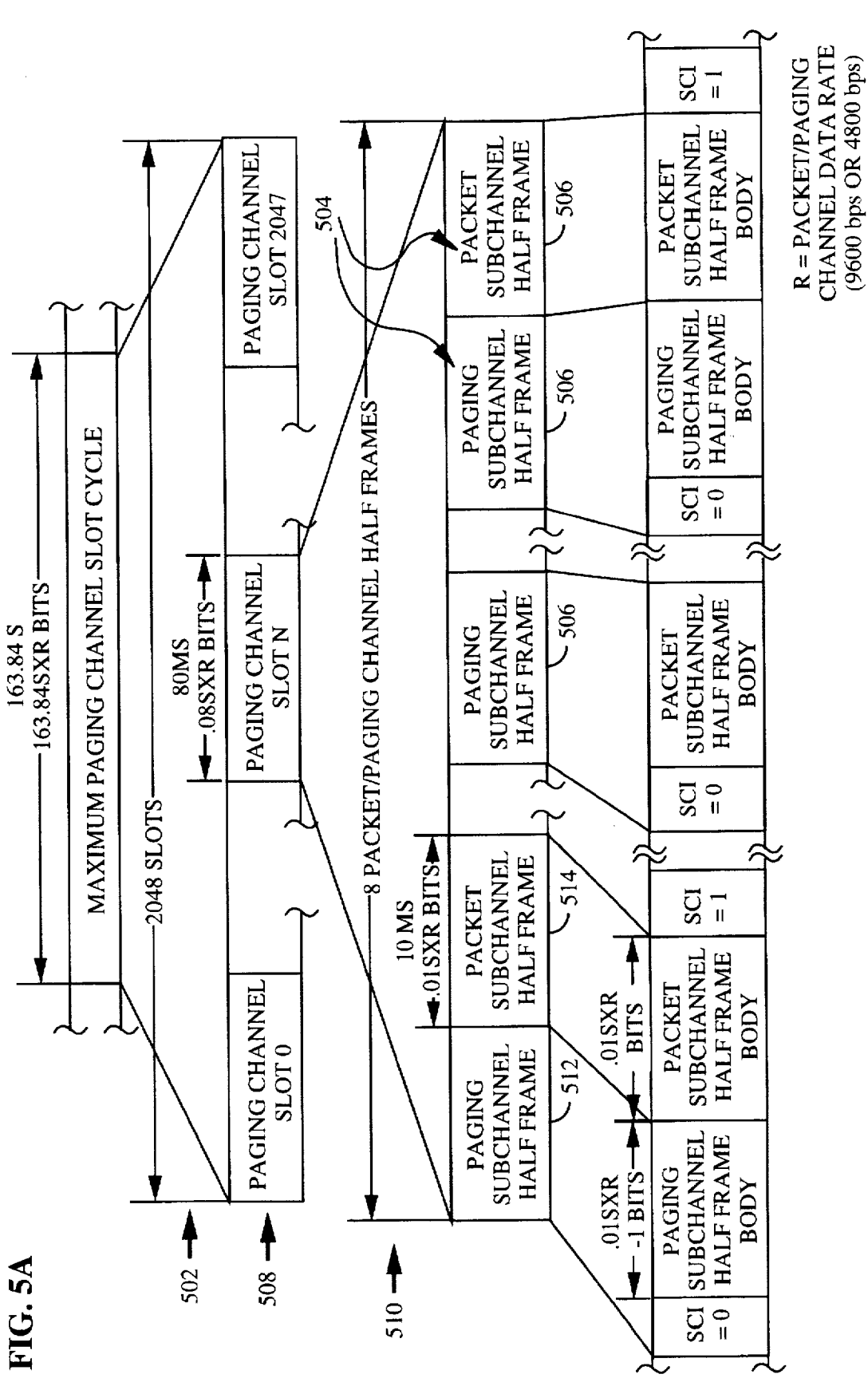
FIG. 5A and FIG. 5B illustrates the structure of the forward link Packet/Paging Channel in accordance with the present invention.
Figure 5B:
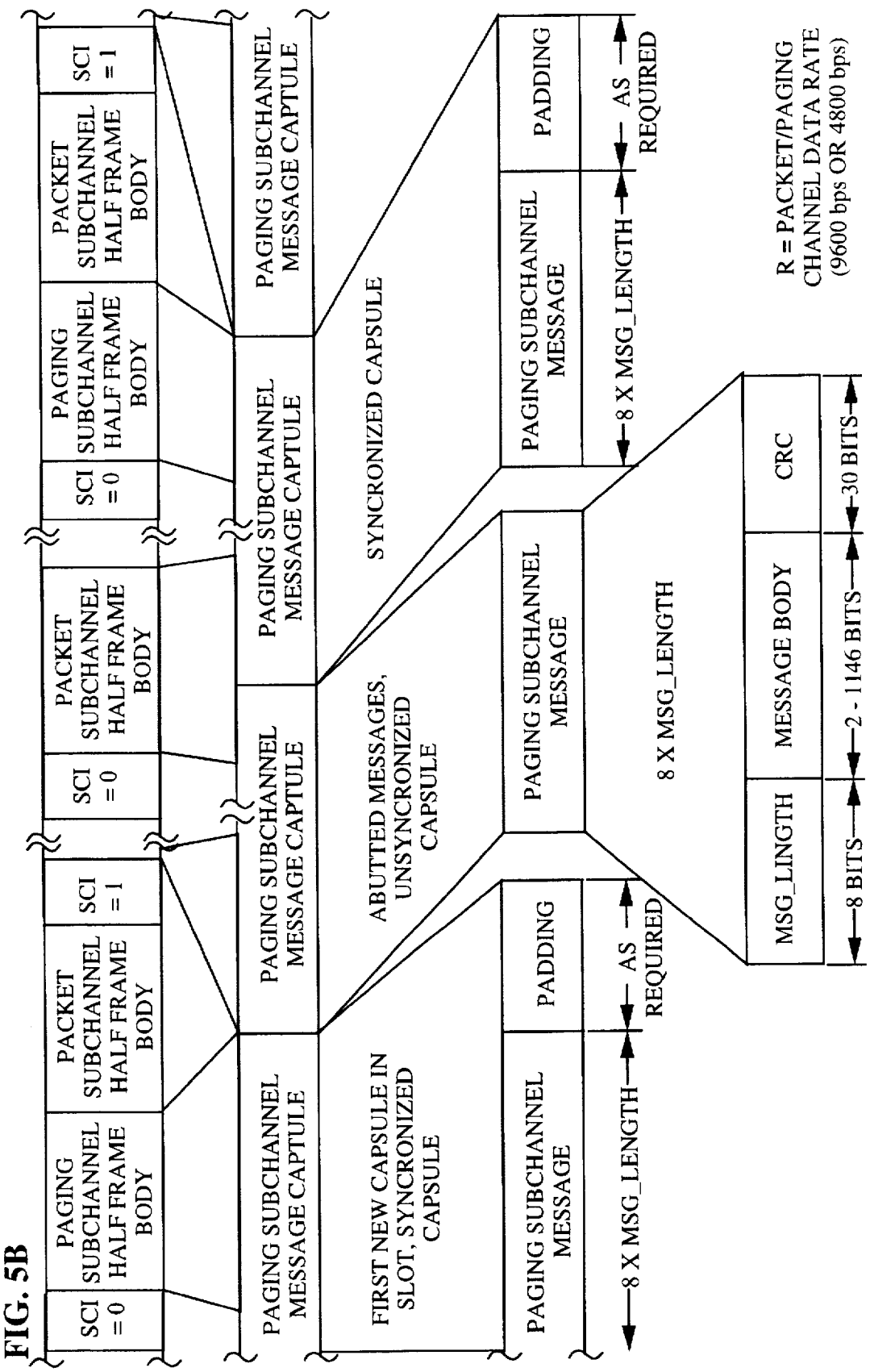

The structure of the forward link of the Packet/Paging Channel will be described with reference to FIG. 5A and FIG. 5B. The structure of the forward link Packet/Paging Channel slots 502, frames 504, and half-frames 506 is similar to that of IS-95 Paging Channels. The Packet/Paging Channel is divided into 80 millisecond ("ms") slots. The slots 502 are grouped into cycles of 2048 slots (163.84 seconds) referred to as maximum slot cycles. Each maximum slot cycle begins at the start of the frame 508 when System Time, in units of 80 ms, modulo 2048 is zero. The slots of each maximum slot cycle are numbered from 0 to 2047, as shown in FIG. 5A and FIG. 5B. A mobile station operating in the slotted mode monitors the Paging Channel using a slot cycle with a length that is a submultiple of the maximum slot cycle length (see §6.6.2-1.1.3 of TIA/EIA/IS-95).

Each 80 ms slot 502 comprises four Packet/Paging Channel frames 510, each of the four frames being 20 ms in length. Each 20 ms long Packet/Paging Channel frame 504 is divided into 10 ms long Packet/Paging Channel half-frames 506. Alternating half-frames contain Paging Subchannel and Packet Sub channel data. The first half frame in each Packet/Paging Channel frame 504 is a Paging Subchannel half-frame 512, while the second half-frame in each Packet/Paging Channel frame 504 is Packet Subchannel half-frame 514. The length of the frames 504, the timing sequence of the half-frames 506, and the division of frames 504 into two half-frames of equal size is of no consequence to the invention. Thus, the frames 504 can have a different length than that specified, the timing sequence can be different, and the half-frames need not be of equal size.

FIG. 5A and FIG. 5B also shows the structure of the Paging Subchannel half-frames 512. The structure of these half-frames 512 is nearly identical to that described in TIA/EIA/IS-95, except that successive alternating half-frames are shown in FIG. 5A and FIG. 5B as concatenated to form the Paging Subchannel data stream, rather than adjacent half-flames as in TIA/EIA/IS-95. The Paging Subchannel structure is shown for reference only, however, because the structure of the Paging Subchannel is of no consequence to the invention, and any other Paging Subchannel structure can be used. The messages and protocols of the Paging Subchannel in the preferred embodiment of the present invention are identical to those of the CDMA Paging Channel, as defined in TIA/EIA/IS-95.

Figure 6A:
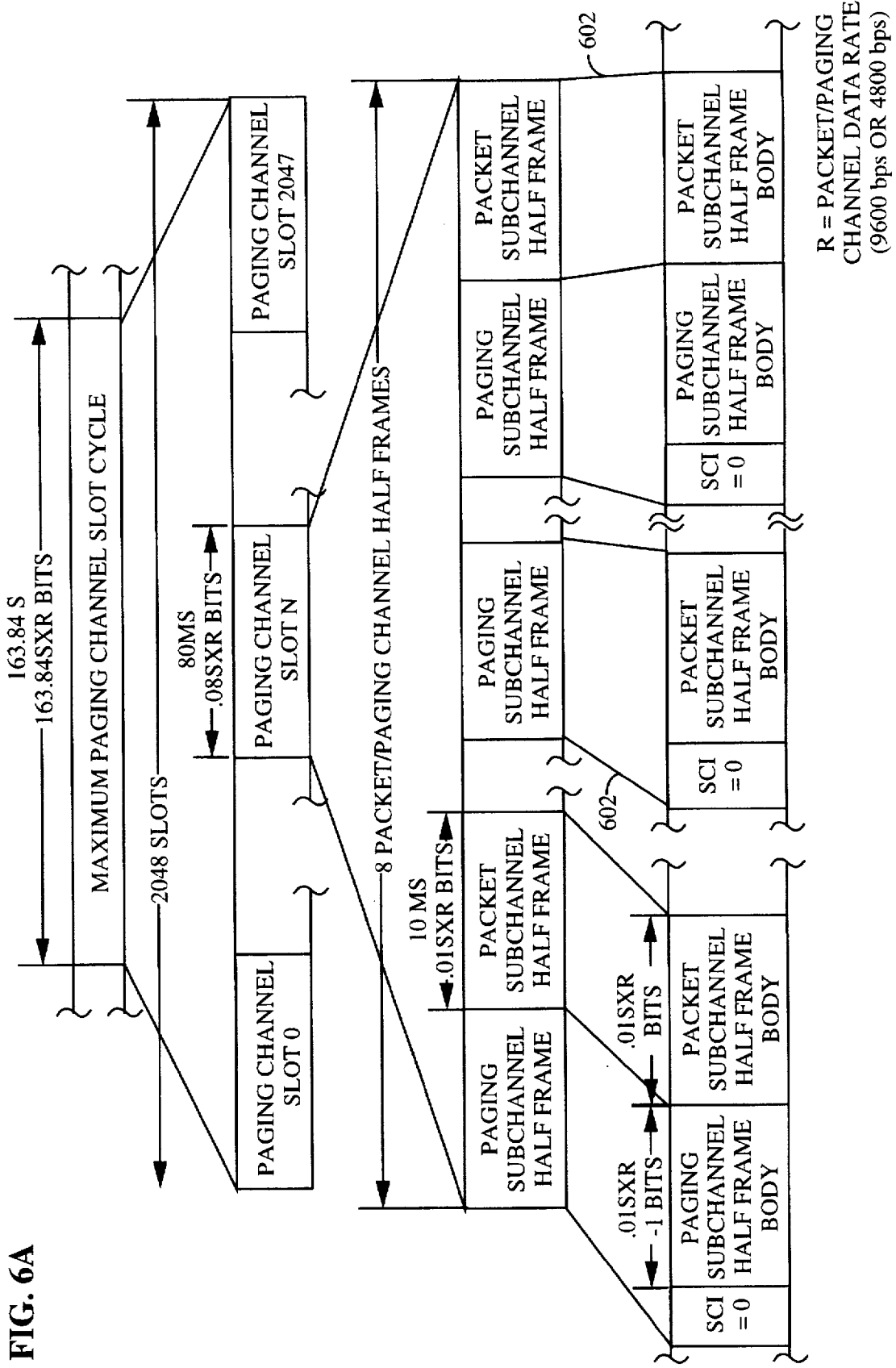
FIG. 6A and FIG. 6B illustrates the structure of the Packet Subchannel of the Packet/Paging Channel of the present invention.
Figure 6B:
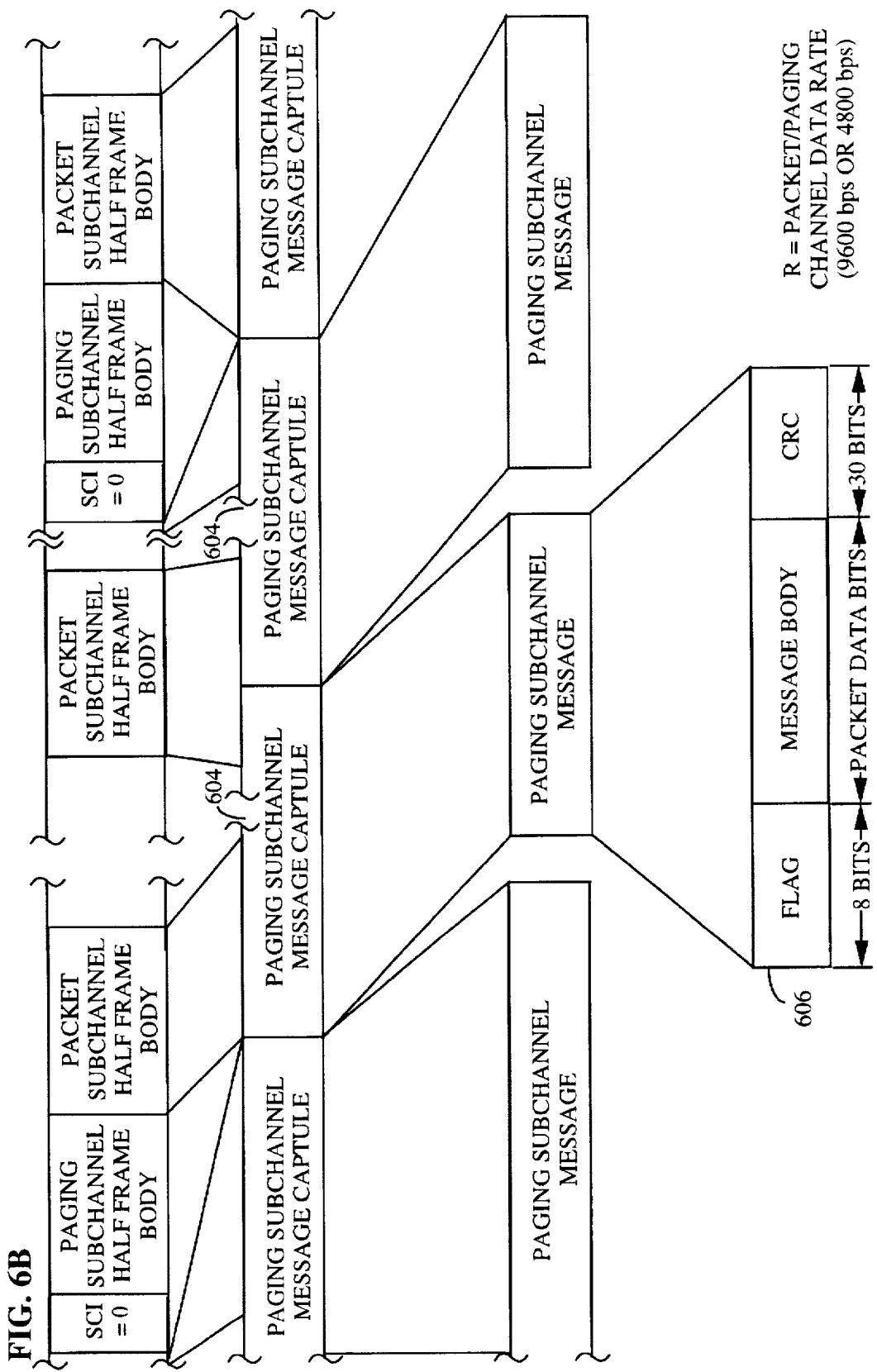

FIG. 6A and FIG. 6B illustrates the structure of the half-frames 602 comprising the Packet Subchannel. The Packet Subchannel is a continuous bit stream within which Packet Subchannel message capsules begin and end without regard to frame or half-frame boundaries. A Packet Subchannel message capsule 604 comprises one Packet Sub channel message plus framing and Cyclic Redundancy Check (CRC), an error detection code, as shown by reference numeral 606. CRC is explained in TIA/EIA/IS-95 §7.7.2.2.2, which defines the 30-bit CRC for the Paging Channel. The Packet Subchannel could be designed similarly.

Figure 7A:
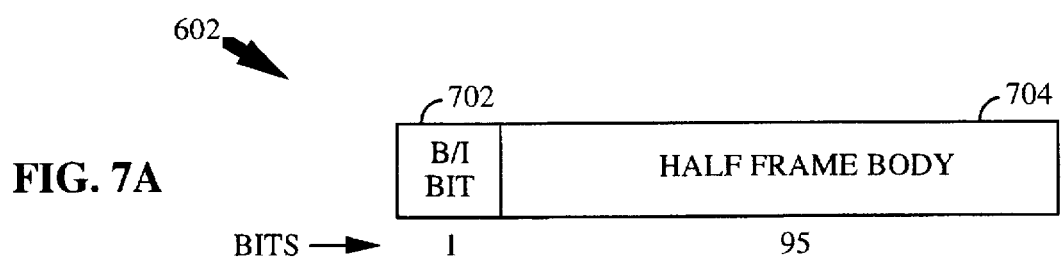
FIGS. 7A-7C illustrate the half-frame structure of the Packet Subchannel of the present invention.
Figure 7B:
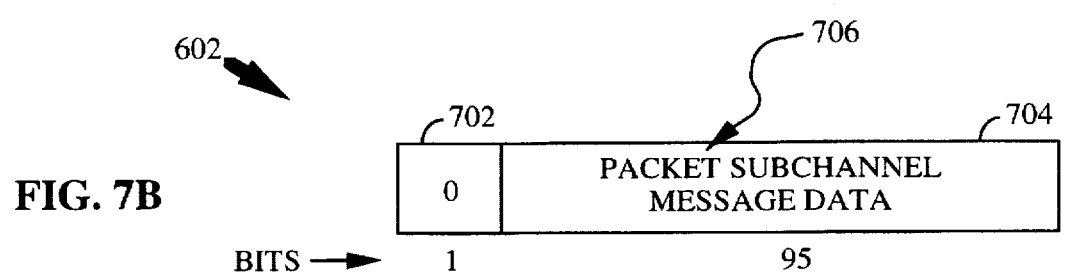
Figure 7C:
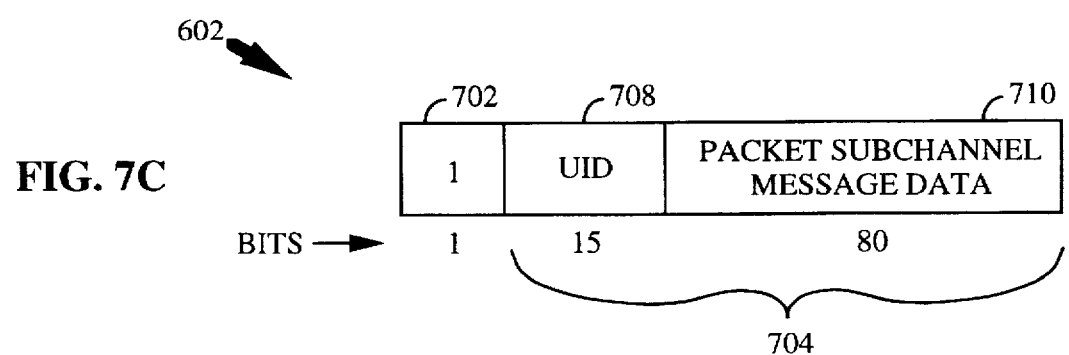

The structure of a Packet Sub channel half-frame 602 is shown in FIGS. 7A–7C. As illustrated in FIG. 7A, each Packet Subchannel half-frame 602 contains a busy/idle bit 702 and a half-frame body 704. Referring to FIG. 7B, if the busy/idle bit 702 is set to zero, the half-frame body contains only Packet Subchannel Message Data 706. When the busy/idle bit 702 is set to zero, the channel is idle and thus open for communication, and, as illustrated in FIG. 7B, the Packet Subchannel Message Data is 95 bits long. The 95 bit length, however, is only exemplary; other Packet Subchannel Message Data lengths can be selected. On the other hand, as illustrated in FIG. 7C, if the busy/idle bit 702 is set to one, meaning the channel is busy, the half-frame body 704 contains a current user identifier (User ID) 708 (15 bits long) and Packet Subchannel Message Data 710 (shown as 80 bits long). Again, these bit lengths are only exemplary.

User IDs are local to a Packet/Paging Channel. That is, the same User ID may be used for different mobile stations on different Packet/Paging Channels. A single Packet/Paging Channel is identified by its Walsh code and the PN sequence offset of the forward CDMA channel (PILOT_PN, as shown in FIG. 4).

Figure 8:
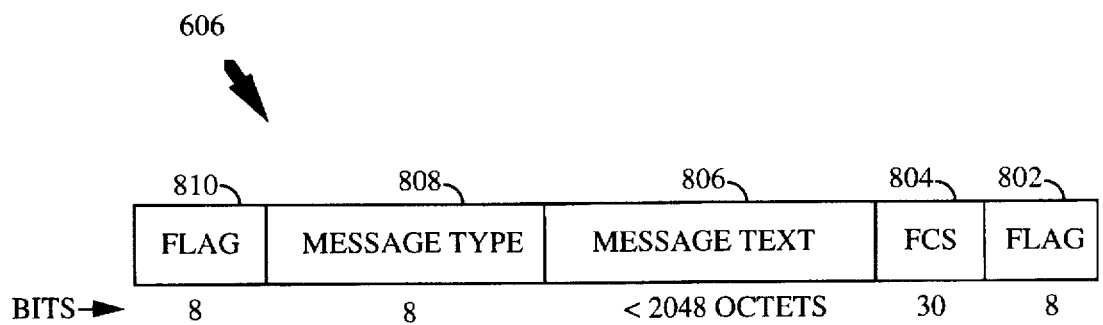
FIG. 8 shows the structure of messages sent on the Packet Subchannel.

Packet Subchannel messages 606 have a structure such as that shown in FIG. 8. At the beginning of the message is a flag octet 802, which may be standard "01111110" flag used in "High-Level Data Link Control" (HDLC) framing, as defined in "Data Communication-High-Level Data Link Control Procedures-Consolidation of Elements of Procedures," International Organization for Standardization ("ISO"), ISO-4335, 1984. Standard HDLC rules for zero insertion and deletion are used to prevent data between flags from being interpreted as flags. The field 804 is a 30-bit Frame Check Sequence (FCS), which is the CRC described in TIA/EIA/IS-95 §7.7.2.2.2. Other framing and frame check methods may be used in accordance with the present invention. The Message Text field 806 holds the data packet being transmitted and has a maximum length of 2048 octets. The message also includes a message type 808, an 8-bit message identifier. Finally, at the end of the message is a second flag octet 810, the same as the flag octet 802 described above. Those skilled in the art will recognize that this message structure is only exemplary.

3. Signaling

To support the Packet/Paging Channel, two Paging Channel message types are used: Packet/Paging Channel Assignment and Packet/Paging Channel Overhead. These messages can be sent on any CDMA Paging Channel, including those defined in TIA/EIA/IS-95 and the Paging Subchannel of the Packet/Paging Channels of the present invention.

The Packet/Paging Channel Assignment message is sent by a base station to assign or deassign a mobile station to the Packet/Paging Channel. Implementations can also include the ability to assign mobile stations to a particular Packet/Paging Channel. The Packet/Paging Channel Assignment message contains a Mobile Station Identifier (MSID), which can be a mobile identification number (MIN), electronic serial number (ESN), or other identifier in the format defined in IS-95. The Assignment message also contains an ASSIGN_TYPE field, which indicates to which type of channel, a Paging Channel or Packet/Paging Channel, the base station is assigning the mobile station. For example, if ASSIGN_TYPE 32 0, then the mobile is being assigned to the Paging Channel; if ASSIGN_TYPE=1, then the mobile is being assigned to the Packet/Paging Channel. Finally, the Packet/Paging Channel Assignment message contains a CHANNEL field, which contains an optional CDMA frequency channel number assigned by the base station.

The Packet/Paging Channel Overhead message is sent by the base station to control global parameters related to the Packet/Paging Channel. The Packet/Paging Channel Overhead message contains a MAX_LEN parameter, which indicates the number of octets permitted in a reverse packet channel transmission burst. The burst may consist of one or more reverse packet channel messages, but the total burst length must not exceed the value of the MAX_LEN parameter. The default value for MAX_LEN is 2047 octets. The Packet/Paging Channel Overhead message also contains a LOCATION_CTRL field, which provides information concerning location of the mobile unit. For example, if LOCATION_CTRL=0, the base station may rely on IS-95 registration methods to locate the mobile station. If LOCATION_CTRL=1, the mobile station transmits a Packet/Paging Channel Request Message after every idle handoff. The methods of mobile station location will be described in detail below.

Two Packet Subchannel message types may be used in this invention to support the Packet/Paging Channel: User ID Assignment messages and Packet Delivery messages. The User ID Assignment message consists of the two types of information in the Message Text field of the Packet Subchannel message. First is a User ID field, which is a 15-bit number identifying a mobile station or broadcast message. User IDs 0–15 are reserved for special uses, as defined in the procedures below. The base station may assign other User IDs to individual mobile stations, permitting them to transmit on the Reverse Packet Channel. The second type of information is a mobile station identifier (MSID), which constitutes an MIN, ESN or other identifier, in the formats defined in IS-95.

The Packet Delivery message consists of three types of information in the Message Text field of the Packet Subchannel message. The first is an ID_TYPE field, with the value "0" indicating a User ID and the value "1" indicating a MSID. The second type of information is an identifier, which can be either a User ID or MSID, according to the value of ID_TYPE. UID and MSID are as defined for the User ID Assignment message. The third type of information is the packet data being transmitted (DATA field). The format and contents of the DATA field are not important to the present invention. In the preferred implementation, however, the contents of this field are in accordance with the Internet Point-to-Point Protocol (PPP) as defined in Internet RFC 1661.

B. The Reverse Link Channel

The reverse link channel of the random access channel will now be described. For convenience, it will be referred to herein as the Reverse Packet Channel. The physical layer, synchronization, structure, and signaling of the Reverse Packet Channel will be described.

1. Physical Layer

The Reverse Packet Channel of the present invention is identical to the CDMA Access Channel defined in §§6.1.2 and 6.1.3 of TIA/EIA/IS-95, with four exceptions. First, the Reverse Packet Channel is addressed by long code PN, using the Public Long Code Mask based on mobile station Electronic Serial Number (ESN), as for CDMA Reverse Traffic Channels (see FIG. 6.1.3.1.8-2 of TIA/EIA/IS-95). Such addressing permits identification and signal level measurement of transmissions from individual mobile stations and thus also provides the ability to use multipath diversity reception and to use close&loop reverse link power control on the Reverse Packet Channels.

Second, one Reverse Packet Channel exists per assigned User ID. Third, the reverse link transmit power is determined as for a CDMA Reverse Traffic Channel, using the open and closed loop procedures defined in §§6.1.2.3 and 6.1.2.4 of TIA/EIA/IS-95. Fourth, the synchronization and structure of the Reverse Packet Channel are as defined in the following descriptions and therefore corresponding sections §§6.6.3.1.1 and 6.7.1.1 of TIA/EIA/IS-95 do not apply.

2. Synchronization

Figure 9:
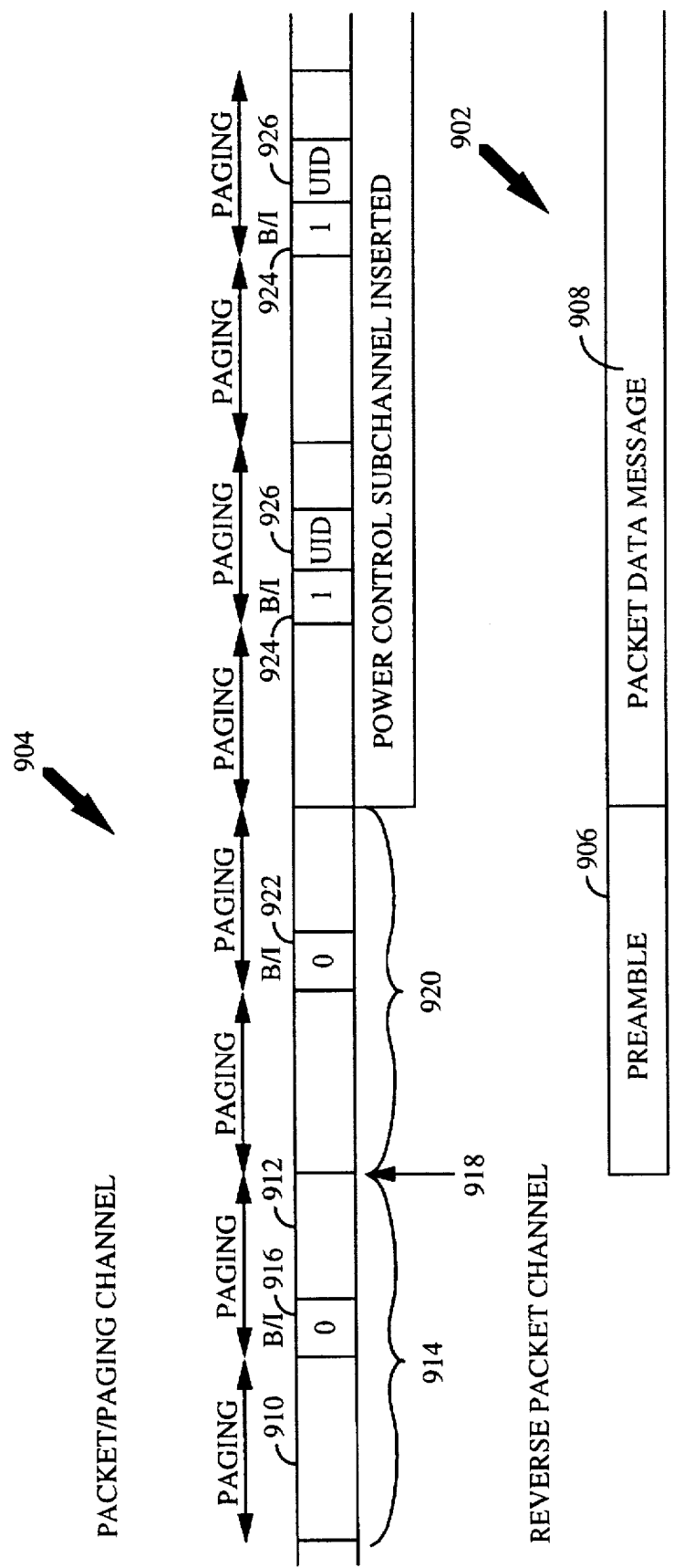
FIG. 9 illustrates the synchronization of a random access channel (or Reverse Packet Channel) in accordance with the present invention.

The timing of Reverse Packet Channel transmissions will be described with reference to FIG. 9. FIG. 9 illustrates the timing of the Reverse Packet Channel 902 with respect to the forward link Packet/Paging Channel 904 described in detail above. As can be seen, the Reverse Packet Channel 902 has a preamble 906 and a packet data message field 908. The Packet/Paging Channel 904 has a Paging Sub channel half-frame 910 (which repeats periodically) and a Packet Subchannel half-frame 912 (which also repeats periodically). A frame 914 of the Packet/Paging Channel 904 comprises the Paging Subchannel half-frame 910 and the Packet Subchannel half-frame 912. At the beginning of each Packet Subchannel half-frame 912 of the Packet/Paging Channel 904 is a busy-idle bit 916, which indicates to the mobile stations monitoring the Packet/Paging Channel 904 whether it is available for communication or busy.

The preamble 906 of the Reverse Packet Channel 902 is the same as for the CDMA Access Channel. The length of the preamble 906 is the same as that of a CDMA Access Channel burst, which is broadcast in the PAM_SIZ field of the *Access Parameters Message*, as defined in TIA/EIA/IS-95 §7.7.2.3.2.2. In FIG. 9, the preamble 906 of the Reverse Packet Channel 902 is shown as one CDMA frame in length.

Mobile stations without User ID assignments cannot transmit on the Reverse Packet Channel 902. The mobile station with a User ID assignment may begin sending the preamble 906 of the Reverse Packet Channel 902 after the end of a frame 914 containing a busy/idle bit of "0" (see reference numeral 916). The first preamble frame 906 is aligned exactly with the frame boundary 918, but the mobile station transmitter is not enabled until the preceding Packet/Paging Channel frame 920 has been decoded and deinterleaved, and the state of its busy/idle bit 922 has been determined.

If busy/idle bit 922 is "1", the mobile station does not enable the transmitter, discards the preamble frame 906, and waits until a subsequent Packet/Paging Channel frame for its next attempt to transmit. Randomization techniques, such as exponential backoff, are well known to those skilled in the art as methods of selecting the frame for the next attempt in order to minimize the likelihood of simultaneous transmissions (collisions) from multiple mobile stations.

If the busy/idle bit 922 is "0", as shown in FIG. 9, the mobile station enables its transmitter and continues sending the preamble 906 for the number of frames indicated in the PAM_SIZ field of the *Access Parameters Message*. At the end of the preamble transmission, the mobile station begins transmitting Reverse Packet Channel data in the packet data message field 908.

When the base station detects a preamble transmission from a mobile station having an assigned User ID on a Packet/Paging Channel, it sets the busy/idle bit to "1" (see reference numeral 924) and places the User ID of the mobile station being received in the UID field 926 of the Packet Channel half-frame.

Transmitting mobile stations observe the busy/idle bit 924 and the UID field 926 in each Packet Subchannel half-frame 912 following the end of the Reverse Packet Channel preamble 906. The mobile station disables the transmitter and schedules a retransmission of the packet data 908 if either of the following two error indications occurs prior to the end of the Reverse Packet Channel 902 data transmission. The first error indication occurs when the busy/idle bit 924 is set to "0". The second error indication occurs when the busy/idle bit 924 is set to "1" and the UID field 926 does not contain the User ID assigned to the mobile station. For this second error indication, a User ID of "0" can be used by the base station to force all mobiles monitoring the Packet/Paging Channel 904 to stop transmitting. This method is also used to indicate that an error has been detected in receiving the packet data 908 from the mobile.

The base station keeps the busy/idle flag set to "1" for two frames following the end of the mobile station's packet data transmission. The User ID in these frames is the User ID of the mobile station if no errors were detected during transmission, or "0" if errors occurred. The base station considers the transmission ended after any of the following: (1) when the base station has received the end of the data part of the transmission, as determined from a length field (see FIG. 10) of the reverse packet data transmission, or (2) at the end of the first frame in which a reception error is detected, or (3) at the end of the first frame during which the mobile station was commanded to cease transmission.

The transmitting mobile station also observes the busy/idle flag for two frames following the end of transmission. If either of the two error indications (see above) occurs, the mobile station assumes that the reception was not successful and reschedules the transmission.

3. Structure

Figure 10:
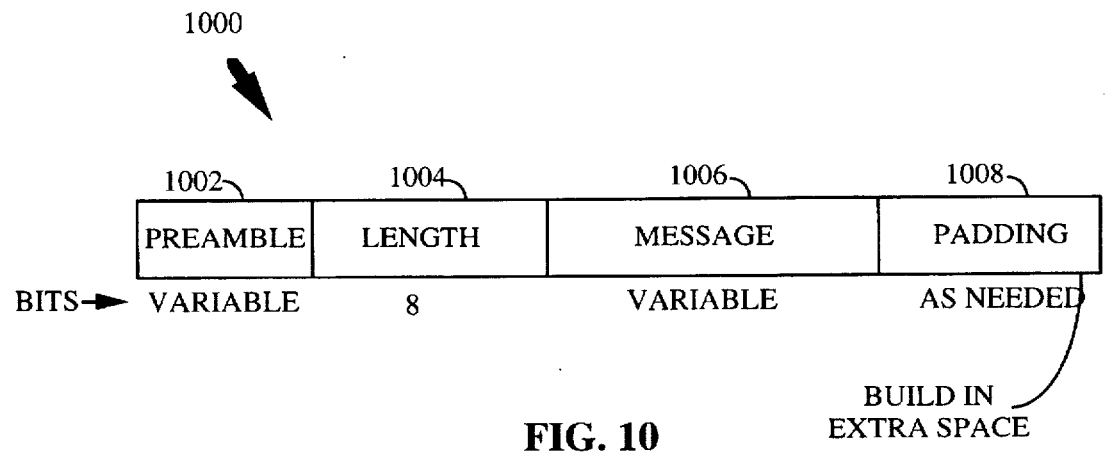
FIG. 10 illustrates the structure of transmissions sent on the Reverse Packet Channel of the present invention.

The structure of Reverse Packet Channel transmissions 1000 is illustrated in FIG. 10. As shown in FIG. 10, Reverse Packet Channel transmissions 1000 have a preamble 1002, a length field 1004, a message field 1006, and a padding field 1008. The preamble 1002 is as discussed above with respect to synchronization of the Reverse Packet Channel. The length field 1004 contains the number of CDMA frames that will be transmitted by the mobile station in this transmission. The message part 1006 of the transmission may contain one or more Reverse Packet Channel messages, having the format shown below. The padding field 1008 consists of all zeros and is added to the end of the message field 1006 to make the transmission span an integer number of CDMA frames. The size of the padding field 1008 is determined by the size of the message field 1006 after zero insertion.

Figure 11:
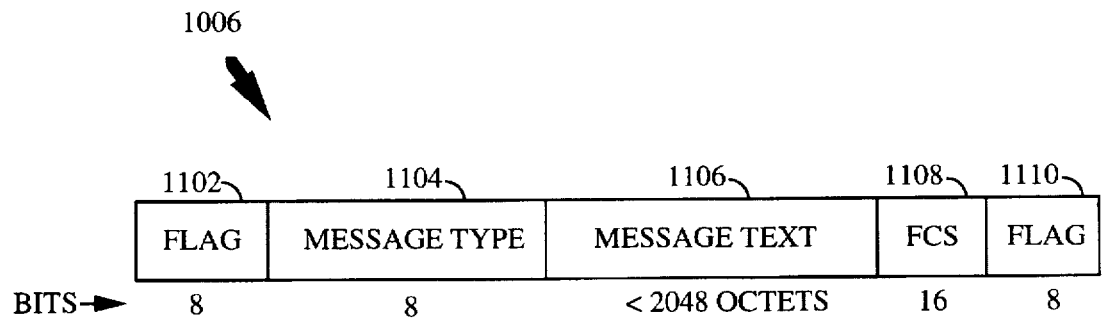
FIG. 11 illustrates the message portion of a transmission sent on the Reverse Packet Channel of the present invention.

With reference to FIG. 11, the message field 1006 of the Reverse Packet Channel transmission 1000 contains one or more instances of message structure, which is the same as for the forward Packet Subchannel. As illustrated in FIG. 11, the message structure of the message field 1006 comprises five fields: a first flag field 1102, a message type field 1104, a message text field 1106, an Frame Check Sequence (FCS) field 1108, and a second flag field 1110. As shown, the first and second flag fields 1102, 1110 are each 8-bit fields. The first flag field 1102, however, can be omitted for the first message in a Reverse Packet Channel transmission. Only one flag field is required between successive messages in a transmission. The message type field 1104 is an 8-bit field, and the FCS field 1108 is 16-bits. Finally, the message text field 1106 is at most 2048 octets long, although it may be shorter. All indicated field sizes, however, are before zero insertion.

4. Signaling

To support the random access channel of the present invention, the mobile stations signal the base stations on Access Channels. Various Access Channel message types are used to support the random access channel, including Packet/Paging Channel Requests and User ID Requests. These messages are sent on the Access Channel selected by the mobile station. Neither of these messages is considered an "implicit registration," as defined in IS-95. The Reverse Packet Channel uses Packet Submit message types, as described herein.

Furthermore, it is assumed that Access Channel messages, such as *Origination Messages*, can be sent on the Reverse Packet Channel as well as on the CDMA Access Channel. This allows the use of the Reverse Packet Channel for more efficient transmission of call control messages, especially for *Origination Messages*, whose length may be restricted on the Access Channel, requiring an *Origination Continuation Message* to complete the transmission of all dialed digits.

III. OPERATING PROCEDURES

A. Packet/Paging and Access Channel Selection

In Packet/Paging Channel selection, mobile stations and base stations select the Packet/Paging Channel in the same manner as selection of the Paging Channel in TIA/EIA/IS-95 §6.6.2.2.1.2. The Walsh code for the selected Packet/Paging Channel is the Paging Channel Walsh code plus 32.

In Access Channel selection, when monitoring the Packet/Paging Channel, mobile stations making access attempts use the same Access Channel as would be used for accesses when monitoring the corresponding Paging Channel. Access Channel selection is described in TIA/EIA/IS-95 §6.6.3.1.1.2.

Figure 12A:
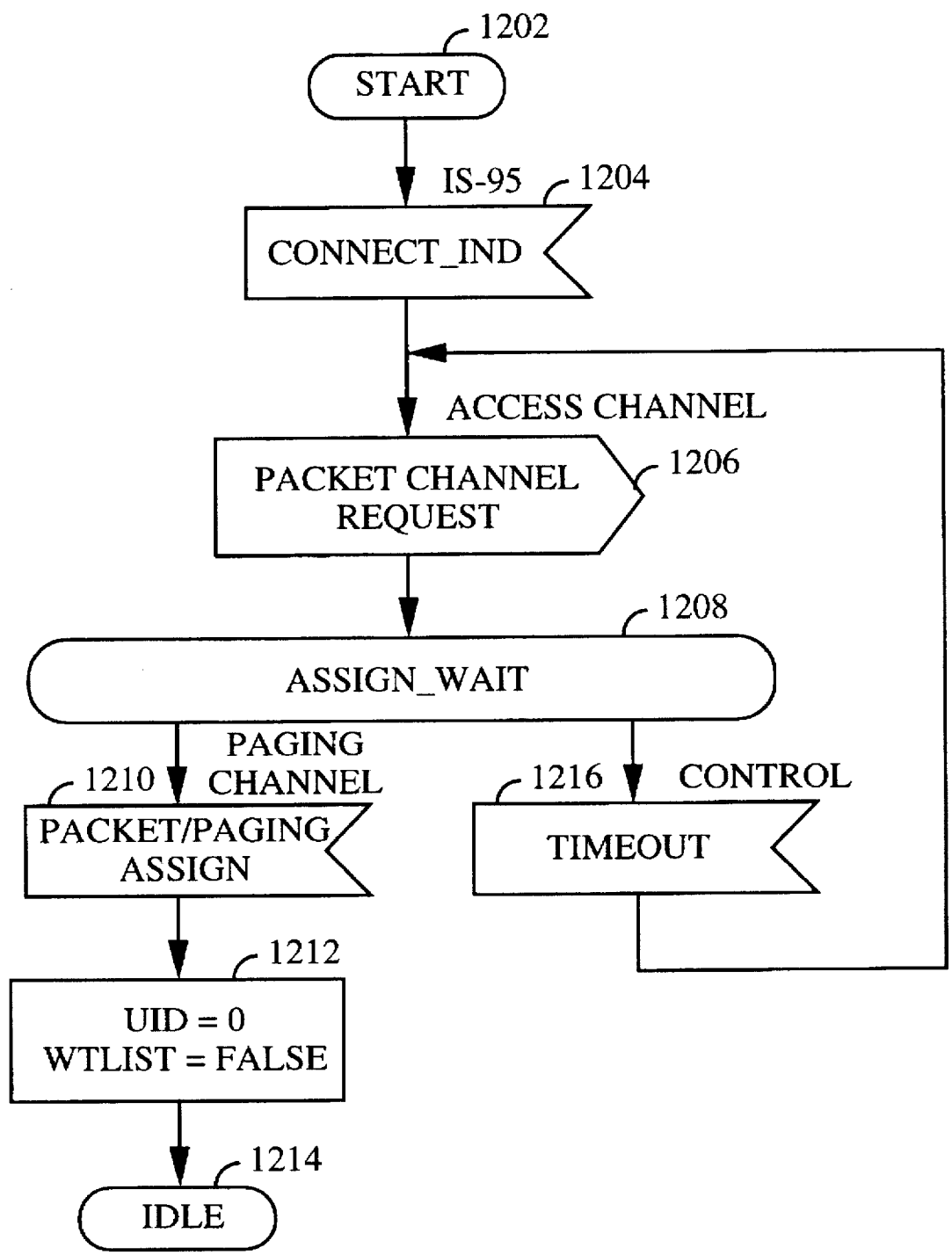
FIGS. 12A-12C are flow diagrams illustrating an exemplary mobile station searcher management scheme in accordance with the present invention.

FIG. 12A illustrates Packet/Paging Channel selection. After a mobile station begins the process of obtaining a Packet/Paging Channel (Step 1202), the mobile station's IS-95 control processor generates a Connect Indication signal (Step 1204), indicating that the mobile station is connected to the IS-95 Paging Channel, which is then monitored by the mobile station. The mobile station then sends a Packet/Paging Channel Request Message on the Access Channel (Step 1206) to the base station and enters an Assignment Wait State 1208, in which the mobile station awaits assignment by the base station to a Packet/Paging Channel. If the mobile station receives no answer to the Packet/Paging Channel Request Message, the control portion of the mobile station generates a Timeout Message (Step 1216), which causes the mobile to leave the Assignment Wait State 1208 and to send another Packet/Paging Channel Request Message (Step 1206). The mobile station then reenters the Assignment Wait State 1208. If, however, the base station answers the mobile station's Packet/Paging Channel Request Message and sends a Packet/Paging Channel Assignment on the Paging Channel (Step 1210), the mobile station deletes any previous searcher reservation by setting the User ID to zero and sets the Wait List Flag to False (Step 1212), which indicates that the mobile station is not on the base station's Wait List awaiting a free searcher. The mobile station then enters the Idle State 1214 and monitors the assigned Packet/Paging Channel.

B. Slotted Paging Mode

When using the Packet/Paging Channel of the present invention, mobile stations that do not have a User ID assignment may operate in the slotted paging mode. This is done according to the requirements of TIA/EIA/IS-95 §6.6.2.1.1. Use of the slotting paging mode provides battery savings during periods when no packet data are being sent or received by the mobile stations.

C. Searcher Management

Acquisition of packet transmissions on the Reverse Packet Channel is performed by a functional entities called "searchers," which are located at base stations and which were described above with reference to FIGS. 1 and 2. The searcher entity is a correlator that continually scans the received signal from the base station antenna, seeking to detect the presence of a reverse channel signal by examining the correlation between the received signal and the known PN spreading sequence (or Long Code) of a mobile transmitter. Methods for implementing correlators for this purpose are well known to those skilled in the art. The searcher looks for a Long Code corresponding to a particular mobile station and that is known to the searcher, as well as preamble data that is also known to the searcher.

The searcher's task is complicated by uncertainty in the delay between the signal emanating from the transmitter and reaching the receiver's antenna. This uncertainty is the result of timing synchronization error and variability in the distance from transmitter to receiver. These factors are inherent in a mobile communication system and cannot be eliminated without a great increase in system cost and complexity. As a result of this uncertainty, a searcher must try a large number of possible timing offsets when seeking a transmitted signal. Since each correlation attempt at a distinct offset requires the collection and integration of signal samples, the searcher hardware and/or software needed for the process is made considerably more complex. Moreover, the time to perform the correlation suggests that a single searcher generally cannot seek more than one PN spreading sequence at a time. Consequently, if there are many possible transmitters, each with a distinct PN sequence to be searched, then in general many searchers are needed.

On the IS-95 Access Channel, the need for many searchers is mitigated by having all mobile stations on a given Access Channel use the same PN spreading sequence (i.e., Long Code). This reduces the number of searchers required, but makes it impossible to resolve transmissions from different mobile stations that transmit simultaneously. (In a CDMA system, if different PN sequences are used, transmissions can be resolved using the processing gain inherent in CDMA.) The inability to resolve transmissions from different mobiles transmitting simultaneously has the following disadvantages: (1) Transmissions from different mobile stations cannot be distinguished from multipath arrivals of the signal from the same mobile station, and, therefore, it is not possible to combine multipath energy. This results in considerable degradation of the sensitivity of the base station's receiver. (2) Mobile station identity cannot be established until the message is fully received and decoded. This prevents using closed-loop power control for Access Channel transmissions and prevents fast feedback to the mobile station about success or failure of the access attempt. These disadvantages reduce the efficiency of the reverse link by requiring more mobile station transmit power to provide fade margin and by making it impossible to quickly terminate mobile station transmissions if errors are detected by the receiver.

The Reverse Packet Channel described herein eliminates these problems by using a mobile station-specific PN sequence (i.e., a Mobile Specific Long Code) for reverse transmissions. From the discussion above, it is clear that the disadvantages of the Access Channel are mitigated by this approach, but at the cost of requiring a searcher for each mobile station that may transmit on the Reverse Packet Channel. Because searcher hardware and/or software will not generally be an unlimited resource, it is necessary to provide a means for sharing a limited number of searchers among all the mobile stations that use a given Reverse Packet Channel.

Two known methods are available for searcher sharing. The first method is polling, wherein the base station sends a poll to each mobile station in turn, giving permission to transmit. This method may be the most efficient for a single searcher, but is inefficient when many searchers are available. The second method is searcher reservation, which is a method used in the present invention, wherein mobile stations use the Access Channel to request searcher assignment and only transmit on the Reverse Packet Channel when a searcher has been reserved.

1. Mobile Station Searcher Management

The mobile station procedures for searcher management will now be described with reference to FIGS. 12A–12C. Before entering the searcher management procedures, a mobile station first obtains a Packet/Paging Channel Assignment from the base station. This was described above with reference to FIG. 12A. As illustrated in FIG. 12A, to enter the Mobile Station Idle State 1214, or after an idle handoff, the mobile station is first connected to and then monitors the IS-95 Paging Channel (Step 1204). The mobile station sends a Packet Channel Request Message on the Access Channel (Step 1206) and enters the Assignment Wait State 1208. If the base station does not respond with a Packet/Paging Channel Assignment Message within a set amount of time, the control portion of the mobile station generates a time out signal (Step 1216), indicating that the base station has not responded, and causing the mobile station to send another Packet Channel Request Message (Step 1206). If, however, the base station does respond and assigns the mobile station to a Packet/Paging Channel (Step 1210), the mobile deletes any previous searcher reservation, sets the User ID to zero and the Wait List Flag to false (Step 1212) and enters the Idle State 1214. The mobile station then monitors the assigned Packet/Paging Channel.

Figure 12B:
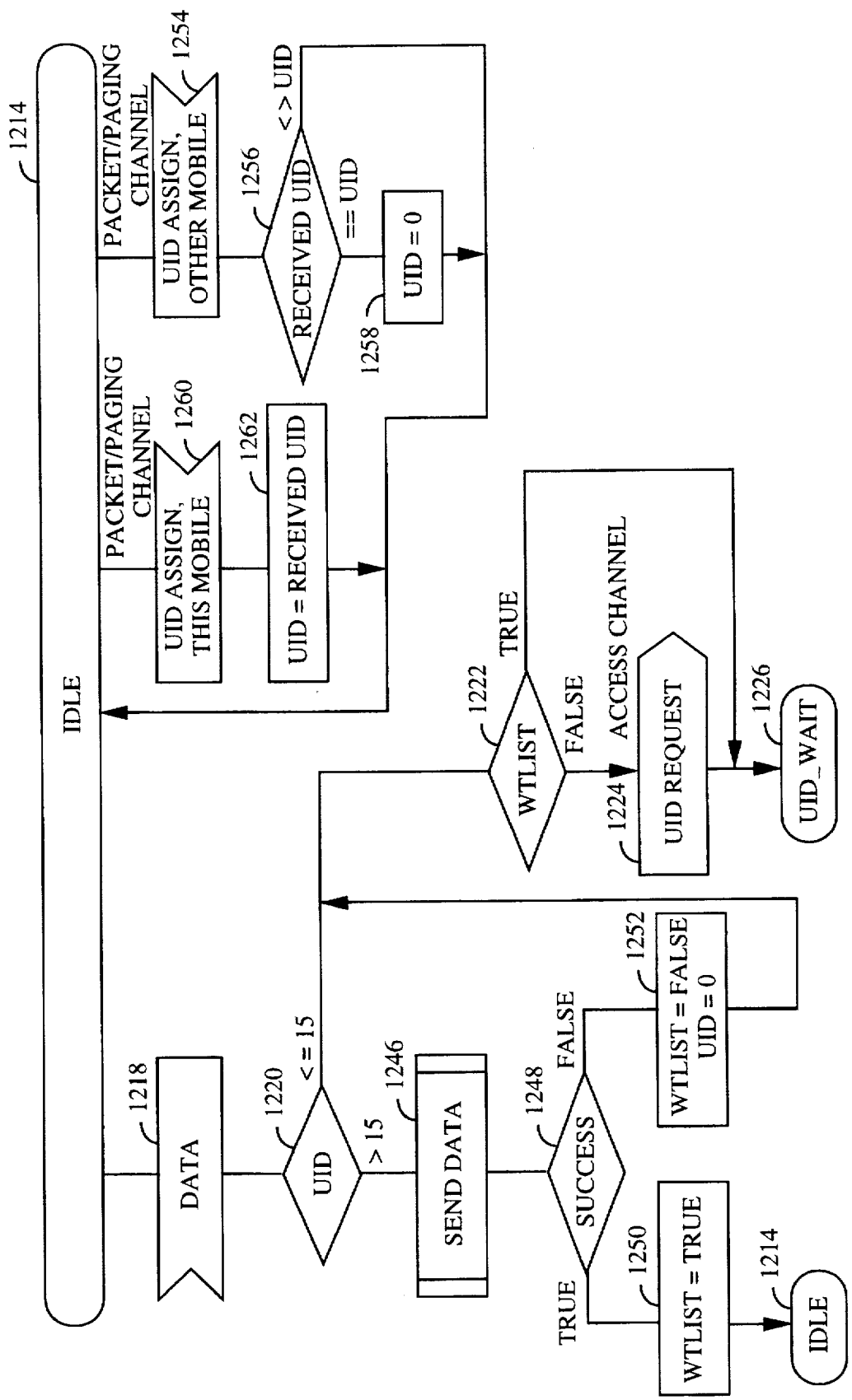

Referring now to FIG. 12B, when in the Idle State 1214, mobile stations monitor the Packet/Paging Channel at all times while assigned to such a channel, including when transmitting. As a result, when in the Idle State 1214, the mobile station may receive a User ID Assignment Message from the base station on the Packet/Paging Channel causing the mobile to delete its searcher reservation and User ID assignment. For example, if the mobile station receives a User ID Assignment Message from the base station that contains the mobile station's assigned User ID, but with an MSID that does not match the mobile station's MSID (Step 1254), the mobile station will examine the received User ID (Step 1256). If the received User ID is not equal to the currently assigned User ID (the "<>UID" branch of Step 1256), the mobile station simply reenters the Idle State 1214. If the received User ID is equal to the currently assigned User ID (the "=UID" branch of Step 1256), the mobile station deletes the searcher reservation and sets the User ID equal to zero (Step 1258). It then reenters the Idle State 1214. Similarly, if the mobile station receives a User ID Assignment Message from the base station containing the mobile's MSID and a User ID of zero (Step 1260), the mobile station sets its User ID equal to the received User ID and deletes its searcher reservation (Step 1262). Again, it reenters the Idle State 1214.

Mobile stations use the following procedure for reserving searchers and sending packet data on the Reverse Packet Channel when in the Idle State 1214. When a mobile station has packet data to send (Step 1218), it must be determined whether its has a searcher reservation (Step 1220). If the User ID is less than or equal to 15, as shown in Step 1220, the mobile station does not have a searcher reservation, and it must then be determined whether the mobile is on the base station Wait List (Step 1222). If it is on the Wait List (i.e., WtList Flag=TRUE), the mobile station is placed in the User ID Wait State 1226. If, on the other hand, the mobile station is not on the wait list (i.e., WtList Flag=FALSE), the mobile sends a User ID Request Message on the Access Channel (Step 1224) and then enters the User ID Wait State 1226.

Figure 12C:
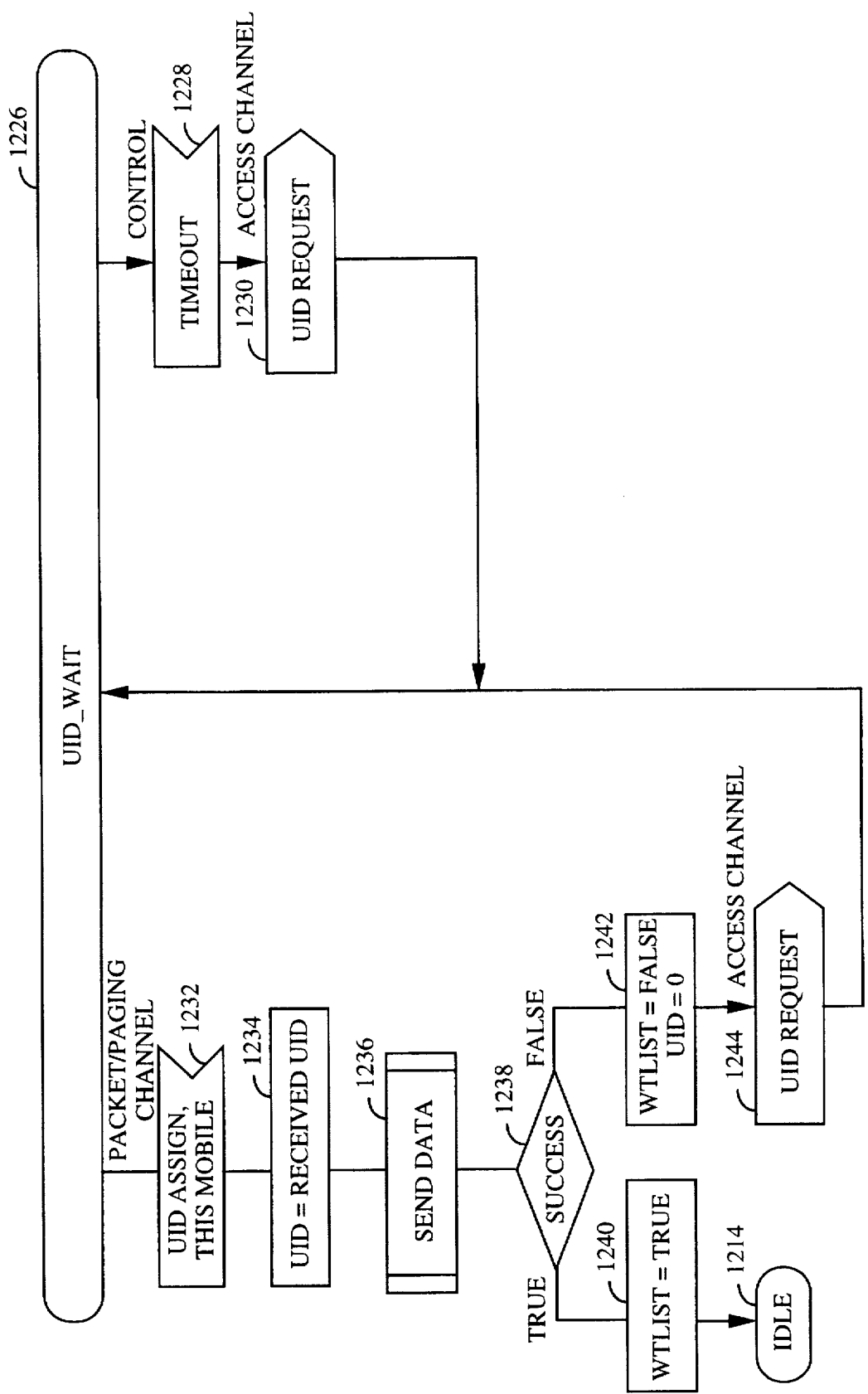

As illustrated in FIG. 12C, once in the User ID Wait State 1226, the mobile station awaits assignment of a User ID from the base station. The control portion of the mobile station monitors the time that the mobile has been in the User ID Wait State 1226 without receiving a User ID assignment, and if that time exceeds some set amount, the control generates a timeout signal (Step 1228). The mobile station then sends another User ID Request Message to the base station on the Access Channel (Step 1230), and the mobile station returns to the User ID Wait State 1226.

If the timeout is not exceeded, and the mobile station receives a User ID assignment from the base station on the Packet/Paging Channel (Step 1232), the mobile station has a searcher reservation and can transmit data packets. The mobile station sets its User ID with the User ID received from the base station (Step 1234). The mobile can then send packet data on the Reverse Packet Channel (Step 1236). The mobile station monitors whether packet data transmissions are successful (Step 1238). If transmission was successful (the "TRUE" branch), the mobile station sets the Wait List Flag to "TRUE" (Step 1240) and enters the Idle State 1214. If, on the other hand, transmission was unsuccessful (the "FALSE" branch), the mobile station sets the Wait List Flag to "FALSE" and the User ID to zero (Step 1242). The mobile then sends another User ID Request Message on the Access Channel (Step 1244) and reenters the User ID Wait State 1226.

Referring back to FIG. 12B, if the User ID received by the mobile station is greater than 15 (see Step 1220), the mobile station already has a User ID and can send packet data. The mobile sends its packet data on the Reverse Packet Channel (Step 1246). It then checks whether transmission was successful (Step 1248). If successful, the Wait List Flag is set to "TRUE" (Step 1250), and the mobile reenters the Idle State 1214. If unsuccessful, the Wait List Flag is set to "FALSE" and the User ID to zero (Step 1252). Thus, with reference to FIG. 9, the mobile station deletes its searcher reservation if the Packet Subchannel busy/idle flag 916 of the Packet/Paging Channel 904 is not set to busy following transmission of a preamble 906 on the Reverse Packet Channel 902. The mobile station then executes Steps 1222–1226 described above.

If the mobile station had successfully transmitted a packet on the Reverse Packet Channel after making a deleted searcher reservation, the mobile station will be placed on the base station's waiting list and need not request a new reservation when it has data to send. Instead, it may wait for the base station's automatic reassignment, which normally occurs at the end of a waiting period. If the mobile station had not successfully transmitted a packet on the Reverse Packet Channel after making the searcher reservation just deleted, the mobile station requests a new reservation when it has data to send.

2. Base Station Searcher Management

Figure 13A:
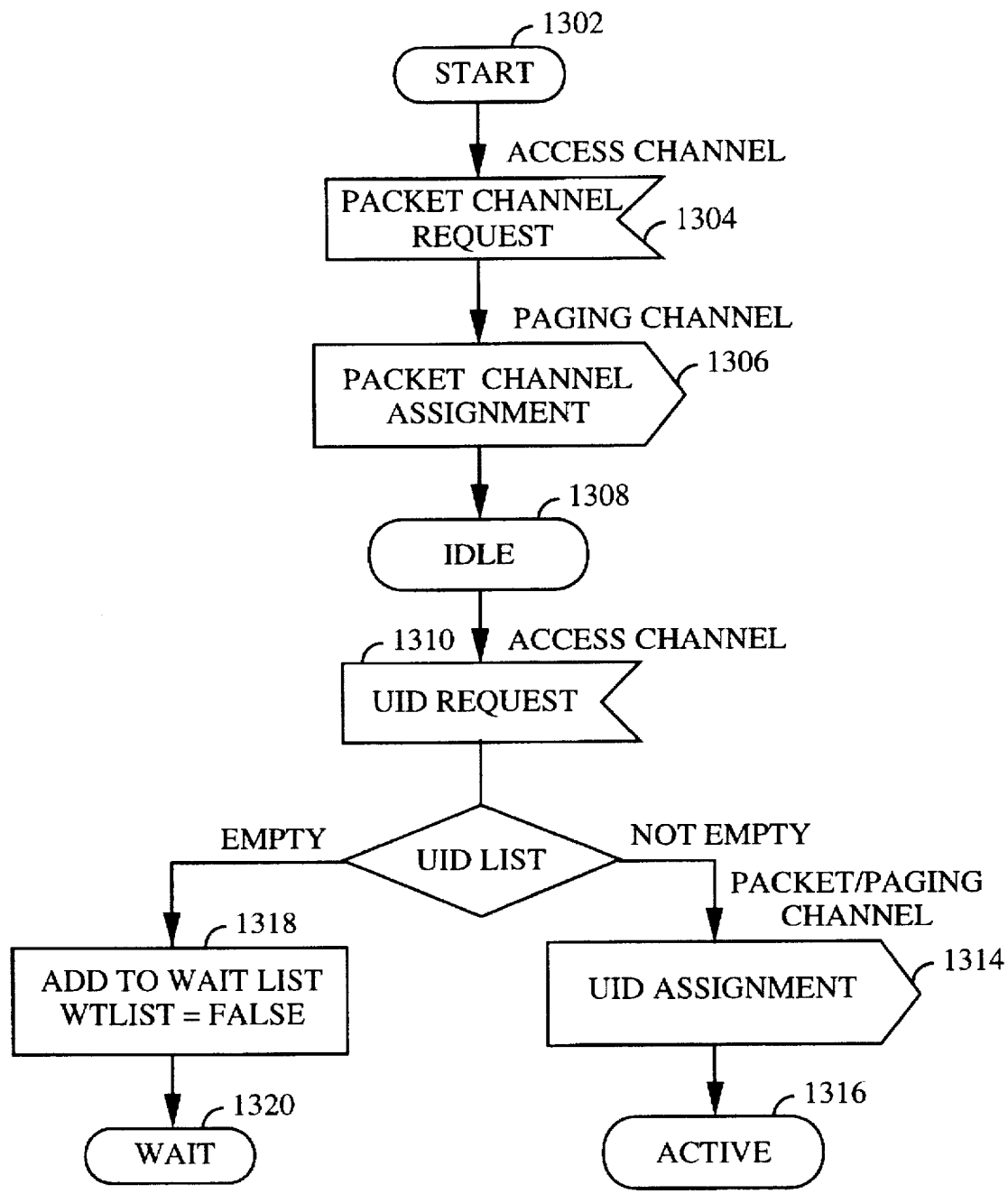
FIGS. 13A-13E are flow diagrams illustrating an exemplary base station searcher management scheme in accordance with the present invention.

With reference to FIGS. 13A–13E, the base station searcher management procedures will be described. Referring to FIG. 13A, after initialization (Step 1302), the base station awaits a Packet Channel Request Message sent by a mobile station over the Access Channel (Step 1304). When the base station receives such a message, it sends a Packet Channel Assignment Message over the Paging Channel (Step 1306) to the mobile station. The base station then enters the Idle State (Step 1308), in which it awaits a User ID request from the mobile station. Presumably, both the mobile and base stations are in the Idle State at this point waiting for a User ID request. Upon receiving a User ID Request Message from the mobile station on the Access Channel (Step 1310), the base station examines the User ID list (Step 1312), looking for an idle searcher.

At this point, the base station begins searcher management procedures. If the base station receives a User ID Request Message from a mobile station when a searcher is idle (i.e., when the User ID list is "NOT EMPTY" in Step 1312), the searcher is assigned to the mobile station, a User ID for the mobile station is selected, and the base station sends a User ID Assignment Message to the mobile station on the Packet/Paging Channel (Step 1314). The base station may verify the mobile station's identity and its permission to use packet data services prior to assigning a User ID. Upon sending the User ID to the mobile station, the base station management procedure enters the Active State 1316, and the searcher begins searching for transmissions from the mobile station encoded with its User Specific Long Code. If, however, the base station receives a User ID Request Message from the mobile station when no searcher is idle (i.e., when the User ID list is "EMPTY" in Step 1312), the base station places the mobile station on a Wait List (Step 1318) and sets the Wait List Flag to "FALSE". The base station then enters the Wait State 1320, and both the mobile station and base station wait for an available User ID.

Figure 13B:
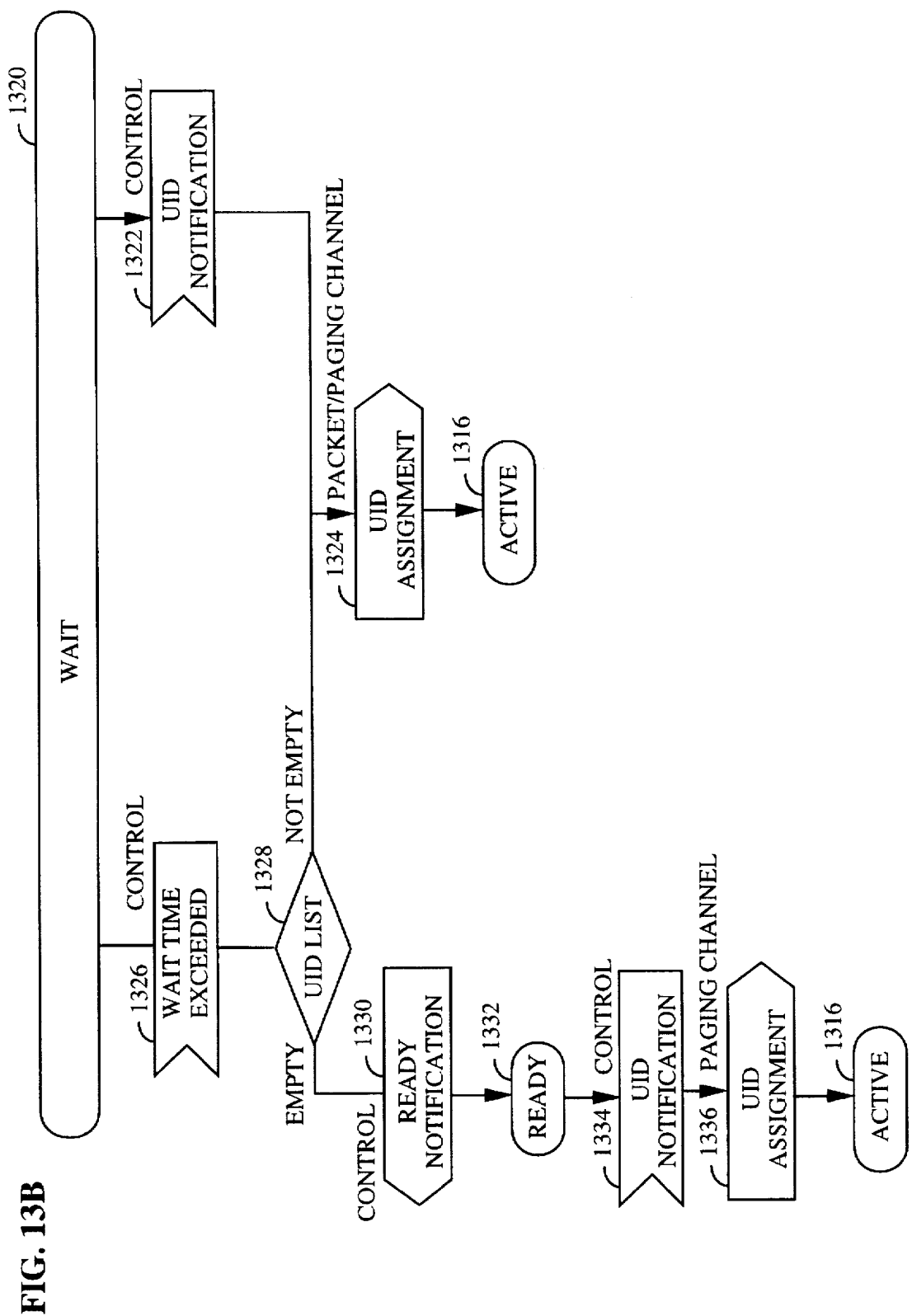

Referring now to FIG. 13B, the base station may exit the Wait State 1320 under at least two circumstances. First, when a searcher becomes available, a User ID notification signal is generated by a base station global searcher control (Step 1322), notifying the base station of the available User ID. The base station then reassigns the available searcher to the waiting mobile station and sends a User ID Assignment Message on the Packet/Paging Channel to the waiting mobile station (Step 1324). The mobile station then enters the Active State 1316.

Second, when the waiting mobile exceeds its wait time, as determined by the base station global searcher control, a Wait Time Exceeded signal is generated by the global searcher control procedure (Step 1326). The base station then examines the User ID list to determine whether or not it is empty (Step 1328). If the User ID list is not empty, the base station reassigns the searcher to the waiting mobile station, executes Step 1324, and then enters the Active State 1316. If the User ID list is empty (Step 1328), a Ready Notification Signal is sent to the global searcher control (Step 1330) indicating that the mobile has exceeded its wait time and that no available User ID exists. The base station then enters the Ready State 1332, which indicates a greater urgency for the mobile to receive a User ID. When a User ID becomes available, the global searcher control then generates a User ID Notification Signal (Step 1334), notifying the base station of the available User ID. The base station then reassigns the searcher from a mobile having an assigned User ID that exceeds its usage allocation, in accordance with its assigned relative priority, to the waiting mobile station. The base station sends a User ID Assignment Message on the Packet/Paging Channel to the waiting mobile station (Step 1336). The mobile station then enters the Active State 1316.

Base stations can use the same User ID previously assigned, or can use a new User ID. If a new User ID is used, the base station must send a separate User ID assignment message to the mobile whose searcher has been reassigned, revoking the User ID assignment. If, however, the revoked mobile station had successfully transmitted a data packet since receiving the User ID assignment being revoked, the base station automatically places the revoked mobile station on the Wait List. The base station will later reassign the revoked mobile station a User ID in accordance with Wait List priority.

Various methods can be used to manage the priority list for waiting and User ID-assigned mobiles, but in the preferred embodiment, the following procedure is used. For each mobile station, a base station maintains four elements that determine the priority order in which User ID assignments are made: (1) Wait time, which is the time elapsed since the mobile station has been placed on the Wait List. (2) Idle time, which is the time since the last successful transmission from a mobile station that has a User ID assignment. (3) Assignment time, which is the time since the mobile station was assigned a User ID. (4) Mobile subscriber priority level, in accordance with the subscribed grade of service for the mobile station user. A wait-time threshold, which is shorter for higher priority levels, an idle-time threshold, which is longer for higher priority levels, and an assignment-time threshold, which is longer for higher priority levels, are all associated with each subscriber priority level. The wait-time threshold is fixed, because it must agree with the mobile station's wait-time threshold, and the latter is not controllable by the base station. Idle-time thresholds and assignment-time thresholds, on the other hand, can be varied by the base station in response to traffic load.

The base station controls the assignment of User IDs to those mobile stations assigned to the Packet/Paging Channel. If the base station is in the Wait State 1320 and a searcher becomes available, the base station sends a User ID Assignment message to the mobile that has exceeded its wait time threshold by the greatest amount (see Step 1322).

Figure 13C:
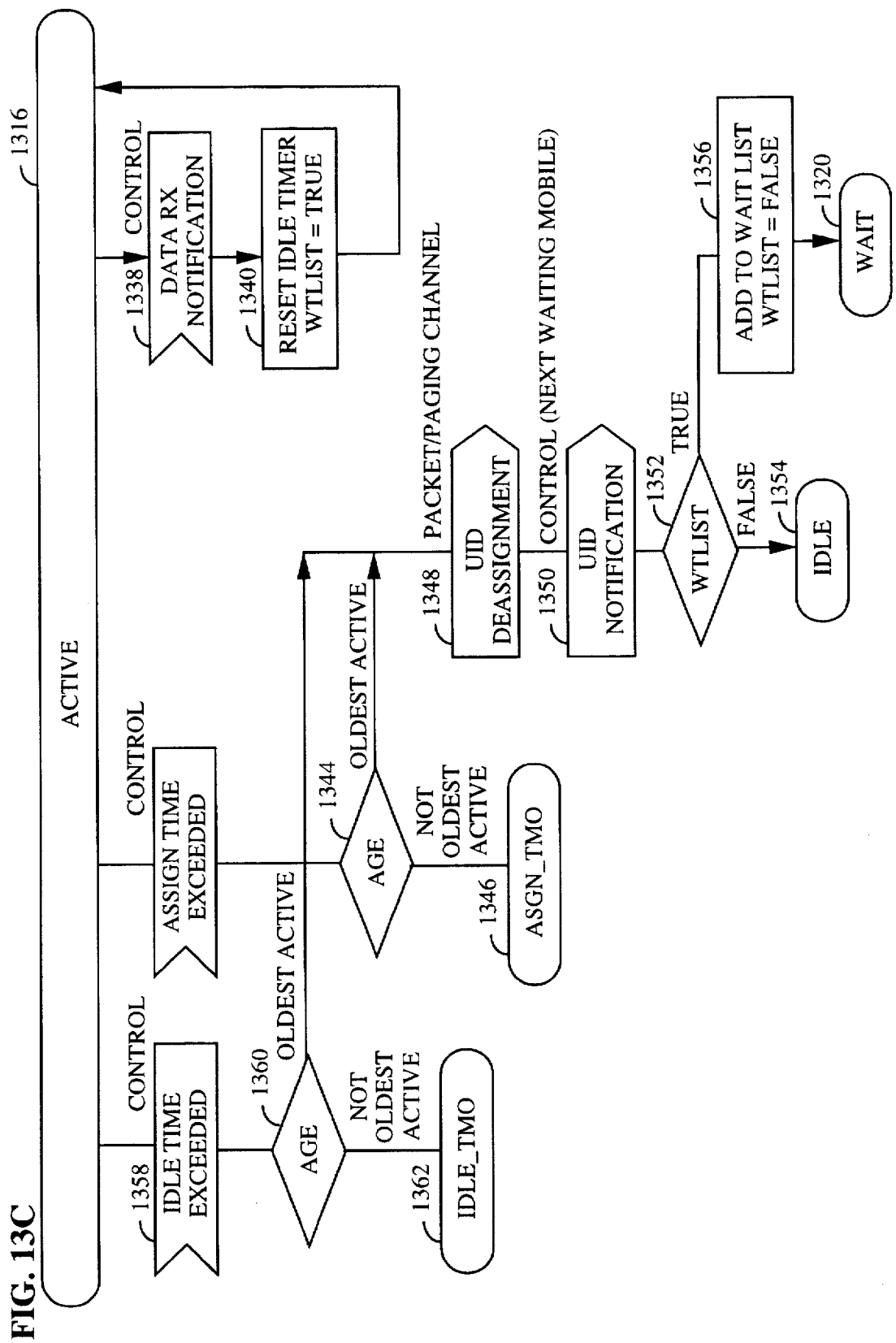

Referring now to FIG. 13C, if any mobile station on the Wait List exceeds its wait-time threshold, the base station will reassign a searcher from active mobile stations (see Step 1316) according to the following procedure:

(1) If no active mobile station (i.e., mobile stations having a User ID assignment) has exceeded its idle-time threshold, nor has any active mobile station exceeded its assignment-time threshold, the base station does not reassign any searchers from active mobile stations to waiting mobile stations. The base station generates a data Tx/Rx Notification signal (Step 1338) and resets the idle timer and sets the Wait List Flag to "TRUE" (Step 1340). The base station then returns to the Active State 1316.

(2) If any mobile station having a UID assignment has exceeded its assignment-time threshold (Step 1342), the base station will reassign the searcher of the mobile station that has exceeded its assignment-time threshold by the maximum amount (Step 1344). This continues until either there are no more mobiles in the Wait List that have exceeded their wait-time thresholds, or there are no more mobiles with User ID assignments that have exceeded their assignment time thresholds. If the mobile being examined for assignment time age (Step 1344) is not the oldest active, the base station enters the Assignment Timeout State 1346. If, on the other hand, the mobile being examined is the oldest active, its User ID is revoked by the base station sending a User ID Deassignment Message to the mobile on the Packet/Paging Channel (Step 1348). The base station global searcher management control then sends a User ID Notification Message to the next waiting mobile station (Step 1350), and the Wait List Flag is examined (Step 1352). If the Wait List Flag is FALSE, meaning the mobile is on the Wait List, the base station enters the Idle State (Step 1354). If the Wait List Flag is TRUE, meaning the mobile is not now on the Wait List, the Wait List Flag is reset to FALSE (Step 1356), and the base station enters the Wait State 1320.

(3) If there remain mobile stations on the Wait List that have exceeded their wait-time thresholds, and there are mobiles having idle times that exceed their idle-time thresholds (Step 1358), the base station will continue reassigning searchers from the pool of such mobiles, beginning with the mobile station that has exceeded its idle-time threshold by the greatest amount (Step 1360). This continues until either there are no more mobiles in the Wait List that have exceeded their wait-time thresholds, or there are no more mobiles with User ID assignments that have exceeded their idle time thresholds. When the oldest active idle mobile (i.e., the one that most exceeds its idle time) is located, the same procedures are followed as when the oldest active assigned mobile is located (in Step 1344). If the mobile being examined is not the oldest active idle mobile, then the base station goes to the Idle Timeout State 1362.

The mobile station also measures its own wait time, and has a wait-time threshold, which varies with the subscriber priority level. The mobile station's wait-time threshold should be greater than the wait-time threshold used by the base station to allow time for the base station's reassignment process to be completed before the mobile station's wait-time threshold is exceeded. If a mobile station's measured wait time exceeds the mobile station wait-time threshold and the mobile station has data to send, the mobile station sends a User ID Request Message and resets the wait time to zero.

Figure 13D:
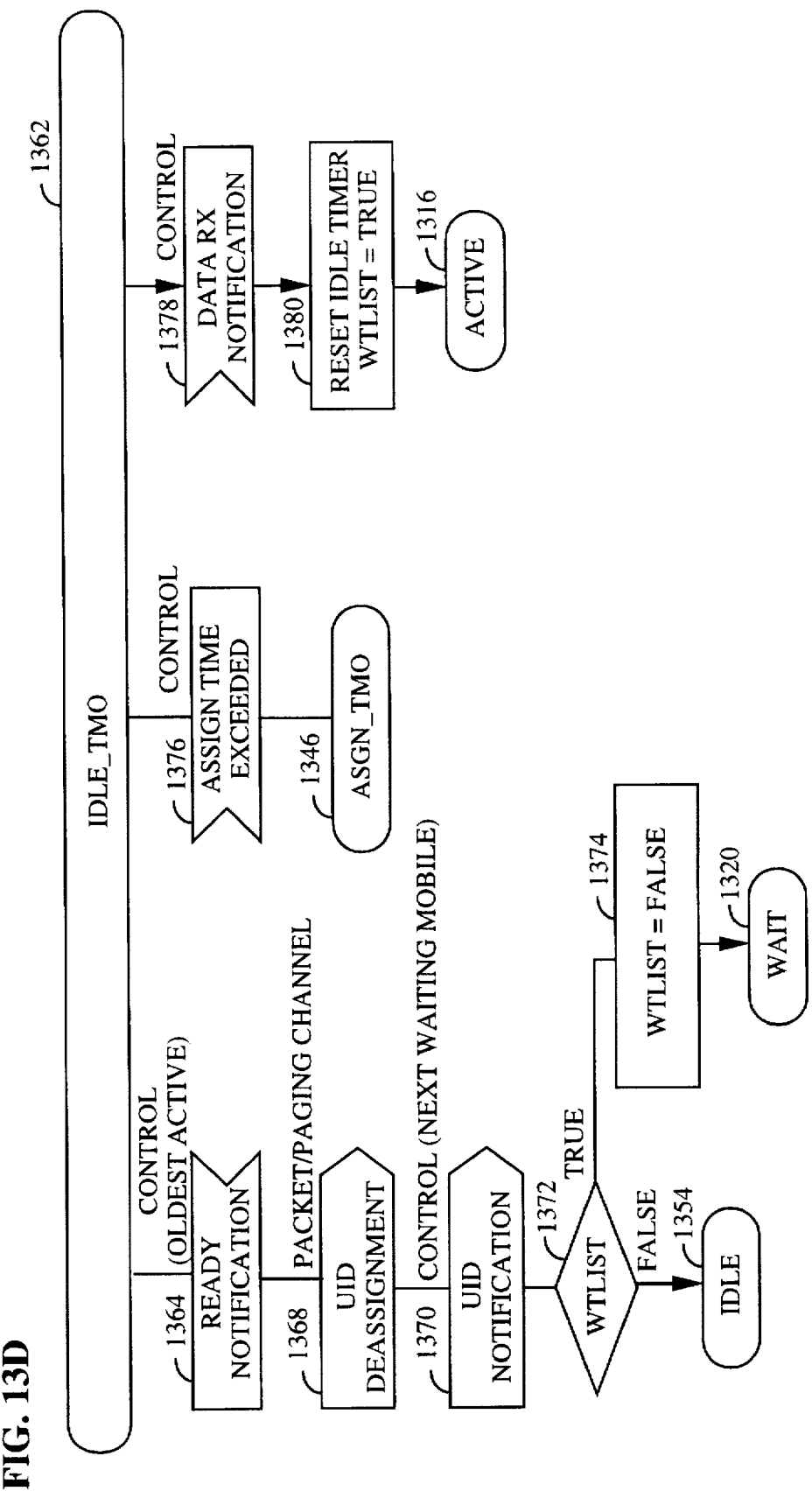

With reference to FIG. 13D, exit from the Idle Timeout State 1362 will be described. As described above, when an active mobile station is examined (in Step 1360) that is not the oldest active idle mobile, the base station enters the Idle Timeout State 1362. At this point, the base station will continue to examine the status of the mobile stations. The base station global searcher control sends a Ready Notification Message to the oldest active idle mobile station (Step 1364). That mobile station's User ID is then revoked via a User ID Deassignment Message sent on the Packet/Paging Channel (Step 1368), and a User ID notification signal is generated by the global searcher control for the next waiting mobile (Step 1370). The Wait List Flag is then examined (Step 1372). If the Wait List Flag is FALSE, meaning the mobile station is on the Wait List, the base station goes to the Idle State 1354. If the Wait List Flag is TRUE, however, meaning the mobile is not on the Wait List, the Wait List Flag is reset to FALSE (Step 1374), and the base station enters the Wait State 1320.

When the base station is in the Idle Timeout State 1362, if the assignment time of a mobile is exceeded (Step 1376), meaning the mobile has had its User ID for too long, the base station enters the Assignment Timeout State 1346. Moreover, when in the Idle Timeout State 1362, the global searcher control generates Data Tx/Rx Notification Messages (Step 1378) that cause the Idle Timer to be reset and the Wait List Flag to be set to TRUE (Step 1380), indicating that the mobile station is not on the Wait List. The base station the enters the Active State 1316.

Figure 13E:
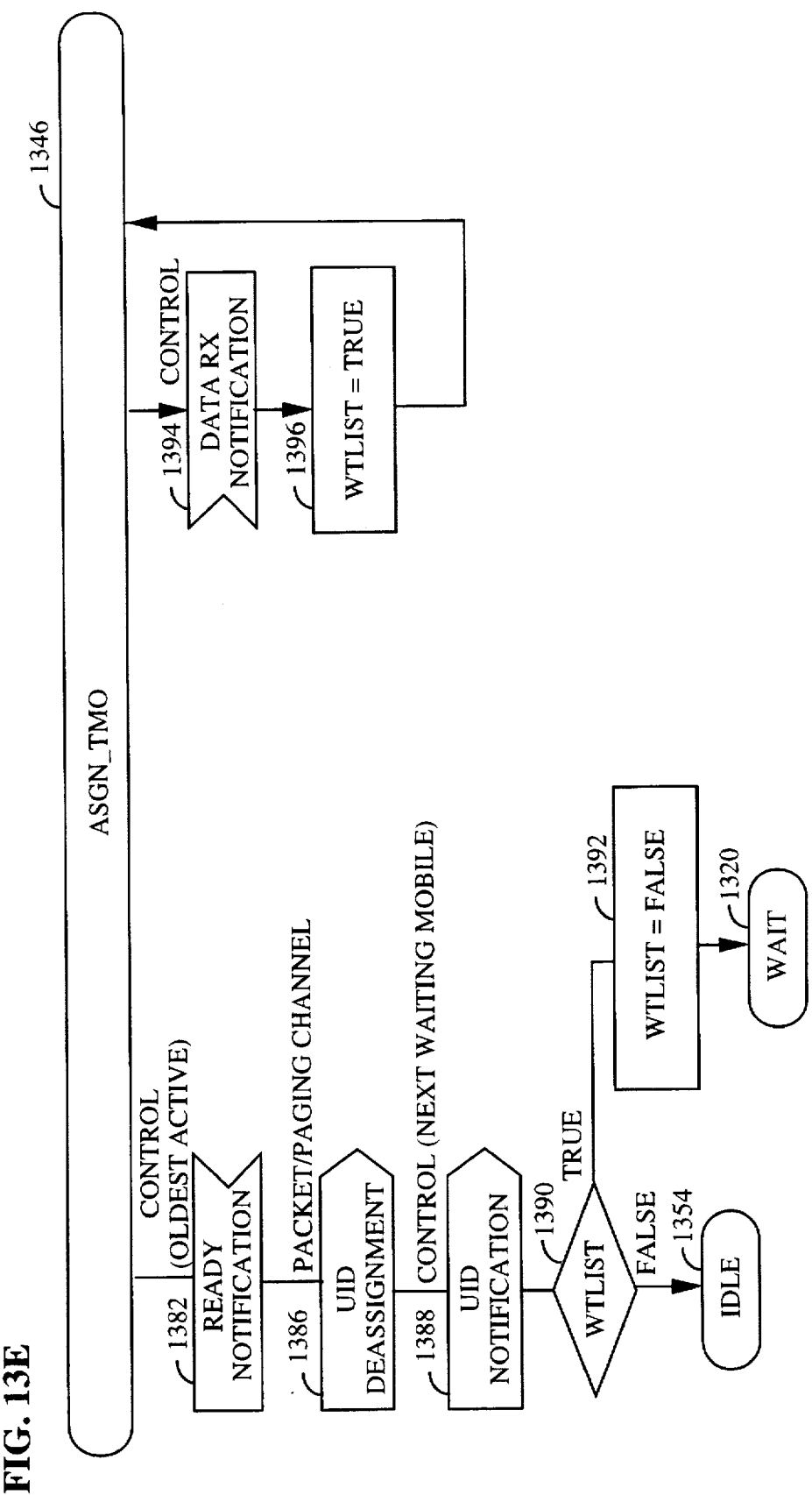

With reference to FIG. 13E, the base station Assignment Timeout State 1346 will be described. The base station may send a Ready Notification Message to its global searcher control (Step 1382), indicating that the oldest active assigned mobile station is about to have its searcher reservation revoked. The base station then revokes that mobile station's User ID by sending a User ID Deassignment Message to the mobile on the Packet/Paging Channel (Step 1386), and a User ID Notification Message is sent by the global searcher control to the next waiting mobile (Step 1388). The Wait List Flag is then examined (Step 1390). If the Wait List Flag is FALSE, the base station enters the Idle State 1354. If the Wait List Flag is TRUE, the Wait List Flag is reset to FALSE (Step 1392), and the base station returns to the Wait State 1320.

Further, in the Assignment Timeout State 1346, the global searcher control generates a Data Tx/Rx Notification Message (Step 1394) when a mobile is transmitting or receiving data. The Wait List Flag is then set to TRUE (Step 1396), and the base station returns to the Assignment Timeout State 1346.

D. Mobile Station Location

When a base station has packet data to transmit to a mobile station, two basic methods may be used to deliver the packet data: (1) The base station may rely on IS-95 registration methods to locate the mobile station. With this method, the base station can either page the mobile station to determine its current cell/sector location before transmitting the packet data, or can simply transmit the packet data throughout the location area of the mobile. (2) The base station may require the mobile station to transmit a Packet/Paging Channel Request Message after every idle handoff, thereby providing exact location information (to the cell/sector) for the mobile at all times.

The first of these methods minimizes the Access Channel traffic generated by the mobile station, at the cost of an increase in Paging Subchannel traffic and a possible delay in packet delivery. The first method may be a desirable method for high-mobility mobile stations. The second method minimizes delay for most packets at the cost of increased Access Channel traffic. It may be the best approach for low-mobility mobile stations.

When using the first method, the base station sets the LOCATION_CTRL field (described above) in a Packet/Paging Channel Overhead Message to "0". The mobile then performs only IS-95 registration as a means of location and packet delivery.

When using the second method, the base station sets the LOCATION_CTRL field in the Packet/Paging Channel Overhead Message to "1". The mobile station sends a Packet/Paging Channel Request Message after every idle handoff. The mobile station also performs IS-95 registration, as required according to the normal IS-95 procedures.

E. Traffic Channel Management

While packet data services are in progress, a mobile station can commence or end operation on a CDMA Traffic Channel at any time. This is done by using the channel assignment, channel release, and related procedures defined in TIA/EIA/IS-95. Herein, reference will be made to the CDMA Traffic Channel. It is to be understood, however, that in general it is preferable to use a dedicated charmel to send transmissions that exceed the bandwidth of the random access channel (e.g., non-bursty, lengthy, or continuous transmissions) between the base station and mobile station. The Traffic Channel referenced in the remainder of this section is merely an exemplary dedicated channel. This section describes the process for switching or transitioning between a dedicated channel (or Traffic Channel) and the random access channel of the present invention when conditions dictate that a transition is beneficial. For convenience, the dedicated channel will be described with specific reference to the Traffic Channel. This process was described above in less detail with respect to FIG. 3.

Either the base station or mobile station may initiate the Traffic Channel assignment process. A mobile station initiates the Traffic Channel assignment process by sending an IS-95 *Origination Message* on either the access Channel or Reverse Packet Channel. A base station can initiate a Traffic Channel assignment by directly assigning a Traffic Channel, or by sending a *Page Message* to the mobile station prior to the assignment.

The base station uses the following procedure to determine when to initiate transitions between the Packet/Paging Channel and Traffic Channels:

(1) If, over a period of time, packet data sent to a mobile or received from a mobile station exceed a predetermined threshold level, the base station assigns the mobile station to a CDMA Traffic Channel. This procedure addresses the problem that packet data usage may exceed the capacity of the Packet/Paging Channel or the Reverse Packet Channel under circumstances where users transfer large amounts of data, or carry out an extended session with frequent exchanges of data packets.

(2) If the mobile station user or the base station sets up a second call appearance (e.g., a voice call simultaneous with packet data service) where a Traffic Channel is necessary to carry the new call appearance, the base station assigns the mobile station to a CDMA Traffic Channel.

(3) If the mobile station is in motion and undergoes a rapid succession of handoffs or signal fades, the base station assigns the mobile station to a CDMA Traffic Channel. It will be advantageous to use a Traffic Channel under such circumstances so that connectivity is maintained (e.g., using the soft handoff feature of CDMA cellular) without excessive Access Channel activity to re-establish Packet/Paging Channel assignments.

(4) When a mobile station's Traffic Channel utilization falls below a configured level, the base station releases the Traffic Channel. Criteria for determining when to release the Traffic Channel include idle time (time since the last packet was sent or received), user priority, and mobility history (rapid succession of handoffs or signal fades).

Mobile stations can request assignment to a CDMA Traffic Channel by sending a CDMA *Origination Message* instead of a Paging/Packet Channel Request when initiating packet data service. Mobile stations can also establish their own criteria for making the transition between Traffic Channel and Packet/Paging Channels, so long as the resulting procedures do not conflict with the base station's procedures.

IV. CONCLUSION

The present invention provides the capacity to communicate data packets in a digital communication system over a random access channel. In CDMA systems, the invention uses Long Codes to encode the data packets and searchers that recognize the Long Codes for acquisition of packet data on the reverse link, permitting multiple users of the system to share random access channels. The present invention provides procedures for managing the searchers. As a result, many users who transmit infrequently and in small bursts can share the resources of the random access channel without the need to have a channel dedicated to each user for transmission of its data packets, thereby increasing efficiency in the system and reducing system and subscriber costs. The ability to track the location of mobile units communicating with the base station is also a feature or this invention.

Furthermore, the present invention provides means for switching or transitioning between the random access channel and a dedicated channel. The random access channel of the present invention is designed to handle bursty data transmissions. A dedicated channel, on the other hand, is dedicated to the user for the duration of its transmission sequence and is used, for example, when the user has a large amount of data to send or is transmitting continuously with little or no break between data transmissions. In accordance with the present invention, both types of channels may be provided as well as the ability to transition between them when conditions dictate. Threshold levels can be established for determining when to transition in either direction (i.e., from the random access channel to the dedicated channel and vice versa). When these threshold levels are met, the user is transitioned to the appropriate channel for transmission of data. In this way, the present invention keeps the random access channel open for bursty users, while providing users with large volume or continuous data a channel by which to communicate their data. Thus, the random access channel is not overburdened and rendered ineffective for its intended purpose.

The design of the random access channel may be different for the forward link and the reverse link. On the forward link, a Packet/Paging Channel is provided incorporating both a Packet Subchannel and a Paging Subchannel. This permits the base station to transmit packet data to a remote user. On the reverse link, a Reverse Packet Channel is provided that handles packet data from remote users so that the data can be sent to the base station.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. In a digital communication system for communicating digital information, said digital communication system having a forward link and a reverse link, a system for communicating a data packet, comprising:

a communicating transceiver, from among a plurality of transceivers each having a different long code, for sending said data packet on a random access channel over said reverse link using said long code corresponding to said communicating transceiver, and for receiving said digital information from said forward link; and a base station for receiving said data packet on said random access channel from said reverse link and for sending said digital information over said forward link, said base station having a searcher which recognizes said data packet as being sent by the communicating transceiver based on said long code corresponding to said communicating transceiver;

wherein said plurality of transceivers share said random access channel and wherein said communicating transceiver requests reservation of said searcher.

2. The system recited in claim 1 wherein the digital communication system includes a broadcast channel for communicating paging and control messages over the forward link; and wherein the digital information is interleaved with said paging and control messages on said broadcast channel.

3. The system recited in claim 2 wherein the digital communication system is a CDMA communication system, and wherein the broadcast channel and a forward data packet channel are combined to obtain a Packet/Paging Channel on the forward link, said Packet/Paging Channel including a Packet Subchannel and a Paging Subchannel.

4. The system recited in claim 3 wherein the Packet/Paging Channel has a power control subchannel for controlling a power level of the data packet when the data packet is being received by the base station.

5. The system recited in claim 1, further comprising a dedicated channel for communicating the data packet.

6. The system recited in claim 5 wherein each of the plurality of digital transceivers has a bandwidth demand, the system further comprising a processor for switching from the random access channel to the dedicated channel when said bandwidth demand exceeds a first threshold level.

7. The system recited in claim 6 wherein the processor switches from the dedicated channel to the random access channel when the bandwidth demand drops below a second threshold level.

8. The system recited in claim 5 wherein the digital communication system is a cellular system having a network of individual cell sites and an active mobile transceiver from among the plurality of digital transceivers is communicating on the random access channel, the system further comprising a processor for switching said active mobile transceiver from the random access channel to the dedicated channel if said active mobile transceiver is undergoing a succession of handoffs between individual cell sites within said network of individual cell sites.

9. The system recited in claim 1 wherein the digital communication system includes a broadcast channel for communicating system information and an access channel for making access requests, said system information including paging messages;

wherein the communicating transceiver sends a searcher request message on said access channel and encodes the data packet using a specific long code corresponding to the communicating transceiver to obtain an encoded data packet, the random access channel comprising a Reverse Packet Channel, the communicating transceiver sending said encoded data packet on said Reverse Packet Channel; and wherein the base station assigns a searcher to the communicating transceiver in response to said searcher request message and sends a searcher assignment to the communicating transceiver.

10. The system recited in claim 9 wherein the base station includes a plurality of searchers for locating the encoded data packet based on the specific long code; and wherein the base station includes a controller for locating an idle searcher from said plurality of searchers and for sending the specific long code to said idle searcher.

11. The system recited in claim 9 wherein the digital communication system includes a Packet/Paging Channel on the forward link; wherein the communicating transceiver sends a Packet/Paging Channel Request Message to the base station on the access channel; and wherein the base station assigns the communicating transceiver to said Packet/Paging Channel in response to receiving said Packet/Paging Channel Request Message.

12. The system recited in claim 9 wherein the base station includes a plurality of searchers for locating the encoded data packet based on the specific long code; wherein the base station has a searcher assignment waiting list; and wherein if the base station is unable to locate an idle searcher from said plurality of searchers, the base station places the communicating transceiver on said searcher assignment waiting list.

13. The system recited in claim 12 wherein when one of the plurality of searchers becomes a new idle searcher, the base station removes the communicating transceiver from the searcher assignment waiting list and assigns the communicating transceiver to said new idle searcher.

14. The system recited in claim 13 wherein each of the plurality of transceivers has a priority level; wherein an assigned transceiver has an assignment to one of the plurality of searchers; and wherein when said priority level of said assigned transceiver becomes lower than said priority level of the communicating transceiver, the base station revokes said assignment from said assigned transceiver resulting in a revoked transceiver and assigns the communicating transceiver to said one searcher.

15. In a digital communication system for communicating digital information between a communicating transceiver and a base station having a searcher, said digital communication system having a forward link and a reverse link, a method for communicating a data packet, comprising the steps of:

requesting reservation of said searcher by said communicating transceiver;

encoding a data packet with a specific long code corresponding to said communicating transceiver to obtain an encoded data packet;

providing to said searcher said specific long code corresponding to the communicating transceiver;

first sending said encoded data packet on a random access channel over said reverse link by said communicating transceiver from among a plurality of digital transceivers each having a different long code, said plurality of digital transceivers sharing said random access channel;

first receiving said encoded data packet on said random access channel from said reverse link by a base station, said searcher recognizing said encoded data packet as being sent by said communicating transceiver based on said corresponding specific long code being provided to said searcher;

second sending said digital information over said forward link by said base station; and second receiving said digital information from said forward link by said communicating transceiver.

16. The method recited in claim 15, further comprising first communicating a paging message and a control message on a broadcast channel over the forward link; and interleaving the digital information with said paging message and said control message on said broadcast channel.

17. The method recited in claim 16 wherein the digital communication system is a CDMA communication system, the method further comprising combining the broadcast channel and a data packet channel to obtain a Packet/Paging Channel on the forward link, said Packet/Paging Channel including a Packet Subchannel and a Paging Subchannel.

18. The method recited in claim 17, further comprising controlling, via a power control subchannel on the Packet/Paging Channel, a power level of the data packet when sending the data packet to the base station.

19. The method recited in claim 15, further comprising communicating the data packet from the communicating transceiver to the base station over a dedicated channel.

20. The method recited in claim 19 wherein each of the plurality of transceivers has a bandwidth demand, the method further comprising first switching from the random access channel to the dedicated channel when said bandwidth demand exceeds a first threshold level.

21. The method recited in claim 20, further comprising second switching from the dedicated channel to the random access channel when the bandwidth demand drops below a second threshold level.

22. The method recited in claim 19 wherein the digital communication system is a cellular system having a network of individual cell sites; and wherein an active mobile transceiver from among the plurality of digital transceivers is communicating on the random access channel, the method further comprising switching said active mobile transceiver from the random access channel to the dedicated channel if said active mobile transceiver is undergoing a succession of handoffs between individual cell sites within said network of individual cell sites.

23. The method recited in claim 15 wherein the digital communication system includes a broadcast channel for communicating system information and an access channel for making access requests, said system information including paging messages, and wherein the random access channel comprises a Reverse Packet Channel, the method further comprising:

third sending a searcher request message on said access channel by the communicating transceiver;

first assigning a searcher to the communicating transceiver by the base station in response to said searcher request message;

fourth sending a searcher assignment to the communicating transceiver by the base station; and encoding the data packet using a specific long code corresponding to the communicating transceiver to obtain an encoded data packet;

wherein the first sending step includes transmitting said encoded data packet on said Reverse Packet Channel over the reverse link.

24. The method recited in claim 23, further comprising locating an idle searcher from a among plurality of searchers; and fifth sending the specific long code to said idle searcher.

25. The method recited in claim 23 wherein the digital communication system includes a Packet/Paging Channel, the method further comprising fifth sending a Packet/Paging Channel Request Message to the base station on the access channel; and second assigning the communicating transceiver to said Packet/Paging Channel in response to receiving said Packet/Paging Channel Request Message.

26. The method recited in claim 23 wherein the base station includes a plurality of searchers for locating the encoded data packet based on the specific long code; and wherein the base station has a searcher assignment waiting list, the method further comprising placing the communicating transceiver on said searcher assignment list if the base station is unable to locate an idle searcher from among said plurality of searchers.

27. The method recited in claim 26, the method further comprising removing the communicating transceiver from the searcher assignment waiting list and second assigning the communicating transceiver to a new idle searcher.

28. The method recited in claim 27 wherein each of the plurality of transceivers has a priority level; and wherein an assigned transceiver has an assignment to one of the plurality of searchers, the method further comprising, when said priority level of said assigned transceiver becomes lower than said priority level of the communicating transceiver, first revoking said assignment from said assigned transceiver resulting in a revoked transceiver and third assigning the communicating transceiver to said one searcher.

29. In a digital communication system for communicating information, said digital communication system including a digital transceiver and a base station, said digital transceiver having a bandwidth demand, a system for data communications, comprising:
 a random access channel for communicating a data packet between said digital transceiver and said base station;
 a dedicated channel for communicating said data packet between said digital transceiver and said base station; and
 a processor for switching from said random access channel to said dedicated channel when said bandwidth demand exceeds a first threshold, and for switching from said dedicated channel to said random access channel when said bandwidth demand drops below a second threshold.

30. The system recited in claim 29 wherein the information is communicated over the digital communication system using code division multiple access (CDMA); and wherein the data packet comprises a CDMA data packet.

31. In a digital communication system for communicating information, said digital communication system including a digital transceiver and a base station, said digital transceiver having a bandwidth demand, a method for data communications, comprising:
 first transmitting a data packet from said digital transceiver to said base station over a random access channel;
 second transmitting said data packet from said digital transceiver to said base station over a dedicated channel;
 first switching from said random access channel to said dedicated channel when said bandwidth demand exceeds a first threshold; and
 second switching from said dedicated channel to said random access channel when said bandwidth demand drops below a second threshold.

32. The method recited in claim 31 wherein the information is communicated over the digital cellular communication system using code division multiple access (CDMA); and wherein the data packet comprises a CDMA data packet.

33. In a digital communication system for communicating information, said digital communication system having a forward link and a reverse link and having a broadcast channel and an access channel, a system for communicating a data packet, comprising:
 a base station for transmitting said data packet on a Packet/Paging Channel over said forward link; and
 a mobile digital transceiver, said mobile digital transceiver receiving said data packet from said Packet/Paging Channel over said forward link.

34. The system recited in claim 33 wherein the base station sends a paging message on the broadcast channel over the forward link to determine a location of the mobile digital transceiver before transmitting the data packet.

35. The system recited in claim 33 wherein the location of the mobile digital transceiver is within an area; and wherein the base station transmits the data packet on the Packet/Paging Channel over the forward link throughout said area.

36. The system recited in claim 33 wherein the system includes a plurality of base stations each having a handoff region; wherein a handoff occurs each time the mobile digital transceiver moves from said handoff region of one of said plurality of base stations to said handoff region of another of said plurality of base stations; and wherein the mobile digital transceiver sends a request message to the base station on the access channel over the reverse link after each said handoff to provide the location of the mobile digital transceiver.

37. In a digital communication system for communicating information, said digital communication system having a forward link and a reverse link and having a broadcast channel and an access channel, a method for communicating a data packet, comprising:
 transmitting said data packet on a Packet/Paging Channel over said forward link by a base station; and
 receiving said data packet from said Packet/Paging Channel over said forward link by a mobile digital transceiver;
 determining a location of said mobile digital transceiver while transmitting said data packet.

38. The method recited in claim 37, further comprising sending a paging message on the broadcast channel over the forward link by the base station to determine the location of the mobile digital transceiver before transmitting the data packet.

39. The method recited in claim 37 wherein the location of the mobile digital transceiver is within an area; wherein the transmitting step includes sending the data packet on the Packet/Paging Channel over the forward link throughout said area.

40. The method recited in claim 37 wherein the system includes a plurality of base stations each having a handoff region; wherein a handoff occurs each time the mobile digital transceiver moves from said handoff region of one of said plurality of base stations to said handoff region of another of said plurality of base stations, the method further comprising sending a request message to the base station on the access channel over the reverse link after each said handoff to provide the location of the mobile digital transceiver.

41. A digital communication system, comprising:
 at least one remote transceiver for transmitting an encoded data packet on a random access channel, each of said at least one remote transceivers for encoding said encoded data packet with a different unique identifying code; and a base station for receiving said encoded data packet on said random access channel, said base station having a decoder for decoding said transmitted encoded data packet in response to said unique identifying code, said at least one remote transceiver requesting reservation of said decoder prior to transmitting said encoded data packet.

42. The digital communication system of claim 41 wherein said base station transmits paging and control messages to said at least one remote transceiver over a broadcast channel, said broadcast channel and said random access channel being multiplexed into a single frequency band.

43. The digital communication system of claim 42 wherein said base station transmits power control messages to said at least one remote transceiver over said broadcast channel, and wherein said at least one remote transceiver adjusts a transmit power level of said encoded data packet in response to said power control messages.

44. The digital communication system of claim 43 wherein each of said at least one remote transceivers has a bandwidth demand, said base station directing said at least one remote transceiver to transmit said encoded data packet on said random access channel when said bandwidth demand is less than a predetermined threshold, and to transmit said encoded data packet on a dedicated transmit channel when said bandwidth demand is greater than said predetermined threshold.

45. A method for communicating a data packet in a digital communication system in which at least one remote transceiver communicates with a base station having a decoder, said method comprising the steps of:

encoding, in at least one remote transceiver, said data packet with a unique identifying code, each of said remote transceivers having a different unique identifying code;

requesting reservation, by said at least one remote transceiver, of said decoder;

transmitting, from said at least one remote transceiver, said encoded data packet on a random access channel;

receiving, at a base station, said encoded data packet on said random access channel; and decoding, at said base station, said received encoded data packet in response to said unique identifying code.

46. The method of claim 45 wherein said base station transmits paging and control messages to said at least one remote transceiver over a broadcast channel, said broadcast channel and said random access channel being multiplexed into a single frequency band.

47. The method of claim 46 further comprising the steps of:

transmitting power control messages from said base station to said at least one remote transceiver over said broadcast channel; and adjusting a transmit power level of said encoded data packet in said at least one remote transceiver in response to said transmitted power control messages.

48. The method of claim 47 wherein each of said at least one remote transceivers has a bandwidth demand, said method further comprising the steps of:

directing said at least one remote transceiver to transmit said encoded data packet on said random access channel when said bandwidth demand is less than a predetermined threshold; and directing said at least one remote transceiver to transmit said encoded data packet on a dedicated transmit channel when said bandwidth demand is greater than said predetermined threshold.

* * * * *